United States Patent
Novak

(10) Patent No.: US 8,562,793 B2
(45) Date of Patent: *Oct. 22, 2013

(54) METHOD AND APPARATUS FOR MICROWAVE REDUCTION OF ORGANIC COMPOUNDS

(76) Inventor: John F. Novak, Fredericktown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,104

(22) Filed: Sep. 14, 2012

(65) Prior Publication Data

US 2013/0056987 A1 Mar. 7, 2013

Related U.S. Application Data

(63) Continuation of application No. 12/731,492, filed on Mar. 25, 2010, now Pat. No. 8,268,133, which is a continuation of application No. 11/670,041, filed on Feb. 1, 2007, now Pat. No. 7,927,465.

(60) Provisional application No. 60/825,002, filed on Sep. 8, 2006, provisional application No. 60/766,644, filed on Feb. 2, 2006.

(51) Int. Cl.
*H05B 6/80* (2006.01)

(52) U.S. Cl.
USPC ............ 204/157.15; 204/157.4; 422/186

(58) Field of Classification Search
USPC ............ 204/157.4, 157.15; 422/186; 34/259; 210/748.01–784.07
See application file for complete search history.

(56) References Cited

U.S. PATENT DOCUMENTS

| 3,566,066 A | 2/1971 | Borthwick |
| 4,123,230 A | 10/1978 | Kirkbride |
| 4,376,034 A | 3/1983 | Wall |

(Continued)

FOREIGN PATENT DOCUMENTS

| DE | 4026800 A1 | 2/1991 |
| JP | 2004099693 | 9/2002 |

(Continued)

OTHER PUBLICATIONS

Scrap Tires: A Resource and Technology Evaluation of Tire Pyrolysis and Other Selected Alternate Technologies, EG&G Idaho, Inc., MRS2440, Nov. 1983.

(Continued)

*Primary Examiner* — Keith Hendricks
*Assistant Examiner* — Kourtney S Carlson
(74) *Attorney, Agent, or Firm* — Hahn Loeser & Parks LLP

(57) ABSTRACT

The invention pertains to utilization of high power density microwave energy to reduce organic compounds to carbon and their constituents, primarily in a gaseous state. The process includes, but is not limited to, scrap tires, plastics, asphalt roofing shingles, computer waste, medical waste, municipal solid waste, construction waste, shale oil, and PCB/PAH/HCB-laden materials. The process includes the steps of feeding organic material into a microwave applicator and exposing the material to microwave energy fed from at least two linear polarized sources in non-parallel alignment to each other, and collecting the material. The at least two sources of microwave energy are from a bifurcated waveguide assembly, whose outputs are perpendicular to each other and fed through waveguide of proper impedance, such that the microwave sources are physically and electrically 90° out of phase to each other. The microwave frequency is between 894 and 1000 MHz, preferably approximately 915 MHz.

35 Claims, 10 Drawing Sheets

(56) References Cited

U.S. PATENT DOCUMENTS

| | | | |
|---|---|---|---|
| 4,378,806 A | 4/1983 | Henley-Cohn | |
| 4,612,940 A | 9/1986 | Kasevich | |
| 4,647,443 A | 3/1987 | Apffel | |
| 4,740,270 A | 4/1988 | Roy | |
| 4,817,711 A | 4/1989 | Jeambey | |
| 4,839,021 A | 6/1989 | Roy | |
| 4,912,971 A | 4/1990 | Jeambey | |
| 4,965,427 A | 10/1990 | Seaborne | |
| 5,084,140 A | 1/1992 | Holland | |
| 5,087,436 A | 2/1992 | Roy | |
| 5,099,086 A | 3/1992 | Roy | |
| 5,116,615 A | 5/1992 | Gokcen et al. | |
| 5,167,772 A | 12/1992 | Parker, Sr. | |
| 5,208,401 A | 5/1993 | Roy | |
| 5,229,099 A | 7/1993 | Roy | |
| 5,242,245 A | 9/1993 | Schellstede | |
| 5,321,222 A | 6/1994 | Bible et al. | |
| 5,330,523 A | 7/1994 | Campbell et al. | |
| 5,330,623 A | 7/1994 | Holland | |
| 5,364,821 A | 11/1994 | Holland | |
| 5,366,595 A | 11/1994 | Padgett et al. | |
| 5,387,321 A | 2/1995 | Holland | |
| 5,390,861 A | 2/1995 | Bishop | |
| 5,397,555 A | 3/1995 | Steinwandel et al. | |
| 5,425,402 A | 6/1995 | Pringle | |
| 5,451,297 A | 9/1995 | Roy | |
| 5,470,384 A | 11/1995 | Cha et al. | |
| 5,507,927 A | 4/1996 | Emery | |
| 5,521,360 A | 5/1996 | Johnson et al. | |
| 5,589,599 A | 12/1996 | McMullen et al. | |
| 5,720,232 A | 2/1998 | Meador | |
| 5,735,948 A | 4/1998 | Cha et al. | |
| 5,836,524 A | 11/1998 | Wang | |
| 5,858,911 A | 1/1999 | Wellen et al. | |
| 5,876,684 A | 3/1999 | Withers et al. | |
| 5,877,395 A | 3/1999 | Emery | |
| 6,008,750 A | 12/1999 | Cottle et al. | |
| 6,080,977 A | 6/2000 | Wetteborn et al. | |
| 6,133,500 A | 10/2000 | Emery | |
| 6,152,306 A | 11/2000 | Miller | |
| 6,165,440 A | 12/2000 | Esenaliev | |
| 6,187,988 B1 | 2/2001 | Cha | |
| 6,193,936 B1 | 2/2001 | Gardner et al. | |
| 6,590,042 B1 | 7/2003 | Tang | |
| 6,693,265 B1 | 2/2004 | Bell et al. | |
| 6,712,816 B2 | 3/2004 | Hung et al. | |
| 7,101,464 B1 | 9/2006 | Pringle | |
| 7,629,497 B2 | 12/2009 | Pringle | |
| 7,927,465 B2 * | 4/2011 | Novak | 204/157.15 |
| 8,268,133 B2 * | 9/2012 | Novak | 204/157.15 |
| 8,283,616 B2 * | 10/2012 | Novak | 219/679 |
| 2002/0046474 A1 | 4/2002 | Novak | |
| 2002/0150539 A1 | 10/2002 | Unger | |
| 2002/0193849 A1 | 12/2002 | Fenn et al. | |
| 2003/0004454 A1 | 1/2003 | Fenn et al. | |
| 2003/0067657 A1 | 4/2003 | Dimmler et al. | |
| 2003/0070912 A1 | 4/2003 | Holzschuh et al. | |
| 2004/0031731 A1 | 2/2004 | Honeycutt et al. | |
| 2004/0147917 A1 | 7/2004 | Mueller, Jr. et al. | |
| 2004/0156852 A1 | 8/2004 | Daum et al. | |
| 2004/0235970 A1 | 11/2004 | Smith et al. | |
| 2004/0241148 A1 | 12/2004 | Bellomo et al. | |
| 2004/0253166 A1 | 12/2004 | Kruesi | |
| 2005/0064045 A1 | 3/2005 | Zhong et al. | |
| 2005/0084456 A1 | 4/2005 | Tang et al. | |
| 2005/0112616 A1 | 5/2005 | Lee et al. | |
| 2006/0004347 A1 | 1/2006 | Altshuler et al. | |
| 2006/0167445 A1 | 7/2006 | Shafirstein | |
| 2007/0095046 A1 | 5/2007 | Wallace | |
| 2007/0102279 A1 | 5/2007 | Novak | |
| 2007/0131591 A1 | 6/2007 | Pringle | |
| 2007/0135877 A1 | 6/2007 | Pringle | |
| 2008/0141589 A1 | 6/2008 | Farneman et al. | |
| 2008/0314730 A1 | 12/2008 | Pringle | |
| 2010/0025304 A1 | 2/2010 | Everleigh et al. | |
| 2010/0069688 A1 | 3/2010 | Pringle et al. | |
| 2010/0092350 A1 | 4/2010 | Pringle et al. | |
| 2010/0096295 A1 | 4/2010 | Pringle et al. | |
| 2010/0111780 A1 | 5/2010 | Pringle et al. | |

FOREIGN PATENT DOCUMENTS

| | | |
|---|---|---|
| JP | 2004181022 | 12/2002 |
| WO | 89/04355 | 5/1989 |
| WO | 91/03281 | 3/1991 |
| WO | 9314821 A1 | 8/1993 |
| WO | 95/05431 | 2/1995 |
| WO | 01/03473 | 1/2001 |
| WO | 0103473 A1 | 1/2001 |
| WO | 0112289 A1 | 2/2001 |
| WO | 02/14764 | 2/2002 |
| WO | 02/24354 | 3/2002 |
| WO | 03016826 A2 | 2/2003 |
| WO | 2008076808 A1 | 6/2008 |

OTHER PUBLICATIONS

Discarded Tires: Energy Conservation Through Alternative Uses, L.L. Gaines & A.M. Wolsky, Argonne National Laboratory, MRS2450, Dec. 1979.

Nippon Steel News, publication No. 309, Nov. 2003.

Approval of the ABB Microwave Disinfection System, Models HG-A 250 S and HG-A 100 S, Ohio EPA, letter dated Aug. 9, 1993.

Anything Into Oil, MRS 0988, publication, undated.

Internet Visionaries Betting on Green Technology Boom, Annys Shin, publication, Apr. 18, 2006.

Factors Influencing the Use of Tire-Derived Fuel, Michael Blumenthal, Rubber Manufacturers Association, Aug. 13, 2003.

Review Generic Tire Burner/Power Plant Jul. 29, 2003.

Evaluating Emissions From Cement Kilns While Substituting Tires, Robert J. Schreiber, Jr. P.E., Schreiber & Yonley Associates, Environmental Engineers, Sep. 3, 2003.

The Integration of Energy Storage Technologies with Renewable Energy and the Grid, notice for a session at the POWER-GEN International, Nov. 28-30, 2006.

Scrap Tires: A Resource and Technology Evaluation of Tire Pyrolysis and Other Selected Alternative Technologies, EG&G Idaho, Inc., Nov. 1983.

Just About Everything You Ever Wanted to Know About Scrap Tires, Scrap Tire Management Council, undated.

Environmental Factors and Waste Tire Pyrolysis, Gasification, and Liquefaction, Final Report, California Integrated Waste Management Board, Jul. 1995.

The Impact of New Tire Technology on Rubber Recycling, Michael Blumenthal, Rubber Manufacturers Association, Washington D.C., Rubber Expo '05 and Fall 168th Technical Meeting & Rubber Executive Summit, undated.

Pneumatic Tire Compounding, Walter H. Waddell, Roop S. Bhakuni, William W. Barbin, and Paul H. Sandstrom, The Goodyear Tire and Rubber Company, Akron, Ohio, undated.

Recycling Scrap Tires Into New Tires, J.L. Zelibor, Jr. and M.N. Blumenthal, Scrap Tire Management Council & F.E. Timmons, Rubber Manufactures Association, contains appendices, undated.

Crumb Rubber Processing in the Twenty-First Century, presented by Terry A. Gray, TAG Resource Recovery at the Third Southeast Regional Scrap Tire Management Conference, Atlanta, Georgia, Oct. 31, 2000.

Discarded Tires: Energy Conservation Through Alternative Uses, L.L. Gaines & A.M. Wolsky, Argonne National Laboratory, Dec. 1979.

Conversion of Scrap Tires to Energy and Its Environmental Issues, Mark H. Hope, APCA International Specialty Conference Environmental Challenges in Energy Utilization During the 90's, Oct. 9-12, 1988.

Method for Using Microwave Radiation, U.S. Appl. No. 60/750,098, filed Dec. 14, 2005, applicant Frank Pringle, priority application for U.S. Patent 7,629,497.

(56) References Cited

OTHER PUBLICATIONS

Burning Tires for Fuel and Tire Pyrolysis: Air Implications, prepared for Control Technology Center by C. Clark, K. Meardon and D. Russel of Pacific Environmental Services, Inc., Dec. 1991.
Energy Recovery From Scrap Tires, Rubber Manufactures Association, Press release, undated.
Tire—Petroleum Energy Comparison, Rubber Manufactures Association, Press release, undated.
Pyrolysis, Rubber Manufactures Association, Press release, May 2002.
A Complete Wastewater Treatment Solution for Small to Medium Residential Communities, Commercial Developments and Industry, The Envirowave Corporation Brochure-MRS2244, undated.
The EnviroWave Process and Waste Tire Reduction, The Envirowave Corporation Brochure-MRS2247, undated.
Remediation of PCB's and Other Organic Contaminants, The Envirowave Corporation Brochure-MRS2252, undated.
Introducing EnviroWave Processes, The Envirowave Corporation Brochure-MRS2256, undated.
Drying and Treating Bio-solids with Microwaves, The Envirowave Corporation Brochure-MRS2263, undated.
The EnviroWave Process and Waste Tire Reduction, The Envirowave Corporation Brochure-MRS2265, undated.
Remediation of PCB's and Other Organic Contaminants, The Envirowave Corporation Brochure-MRS2267, undated.
Introducing EnviroWave Processes, The Envirowave Corporation Brochure-MRS2270, undated.
Drying and Treating Bio-solids with Microwaves, The Envirowave Corporation Brochure-MRS2273, undated.
The EnviroWave Process and Waste Tire Reduction, The Envirowave Corporation Brochure-MRS4294, undated.
Introducing EnviroWave Processes, The Envirowave Corporation Brochure-MRS4292, undated.
Introducing EnviroWave Processes, The Envirowave Corporation Brochure-MRS4351, undated.
Drying and Treating Bio-solids with Microwaves, The Envirowave Corporation Brochure-MRS4353, undated.
Remediation of PCB's and Other Organic Contaminants, The Envirowave Corporation Brochure-MRS4355, undated.
The EnviroWave Process and Waste Tire Reduction, The Envirowave Corporation Brochure-MRS4357, undated.
Introducing EnviroWave Processes, The Envirowave Corporation Brochure-ENV02759, undated.
Drying and Treating Bio-solids with Microwaves, The Envirowave Corporation Brochure-ENV02761, undated.
Stabilizing and Drying Soil with Microwaves—The EnviroWave Mobile Ground Dryer, The Envirowave Corporation Brochure-MRS2254, undated.
Remediation of PCB's and Other Organic Contaminants, The Envirowave Corporation Brochure-ENV02763, undated.
The EnviroWaveProcess and Waste Tire Reduction, The Envirowave Corporation Brochure-ENV02765, undated.
Chromatographic Instrumentation: Gas Chromatography, 2004.
Chemistry of Rubber Processing and Disposal, Robert L. Bebb, Environmental Health Perspectives, vol. 17, pp. 95-101, 1976.
Refrigerated Condensers, Radian Corporation, 1995.
Fuel Oils, Chemical and Physical Information, MRS2304, undated.
Pneumatic Tire Compounding, Walter H. Waddell, Roop S. Bhakunl, William W. Barbin, and Paul H. Sandstrom;The Goodyear Tire & Rubber Company, undated.
Equipment and Methods for Waveguide Power Measurement in Microwave Heating Applications, John F. Gerling; Gerling Applied Engineering, Inc., 2002.
Resonant Cavities, An Energy Storage Device, Advanced Microwave Technology, undated.
Frequency—Penetration of Waves, M-E-S Technologies, undated.
A Basic Introduction to Microwave Chemistry, Microwave Chemistry, Introductory page, printout,undated.
NIST Standard Reference Database No. 69, NIST Chemistry WebBook, printout, undated.
Reaction Search, printout, undated.
Search for Species Data by Structure Classification, printout, undated.
Lenntech, Molecular Weight Calculator (Molar Mass) printout, undated.
Fuel Oils, Chemical and Physical Information, MRS2415, undated.
Distillation, an Introduction, M.T. Tham, printout, undated.
Microwave Engineering & Technology Contact List, Jun. 16, 2005.
Microwave System for Laboratory Process Research, Gerling Applied Engineering, Inc., Bulletin #960008,Sep. 14, 2000.
Gigatherm, How to Plan and to Set Up a Microwave Facility, Oct. 12, 2005.
Recycling Scrap Tires Into New Tires, J.L. Zelibor, Jr. and M.H. Blumenthal, Scrap Tire Management Council & F.E. Timmons, Rubber Manufactures Association, MRS2378, undated.
Waveguide Components and Configurations for Optimal Performance in Microwave Heating Systems, John F. Gerling; Gerling Applied Engineering, Inc., 2002.

* cited by examiner

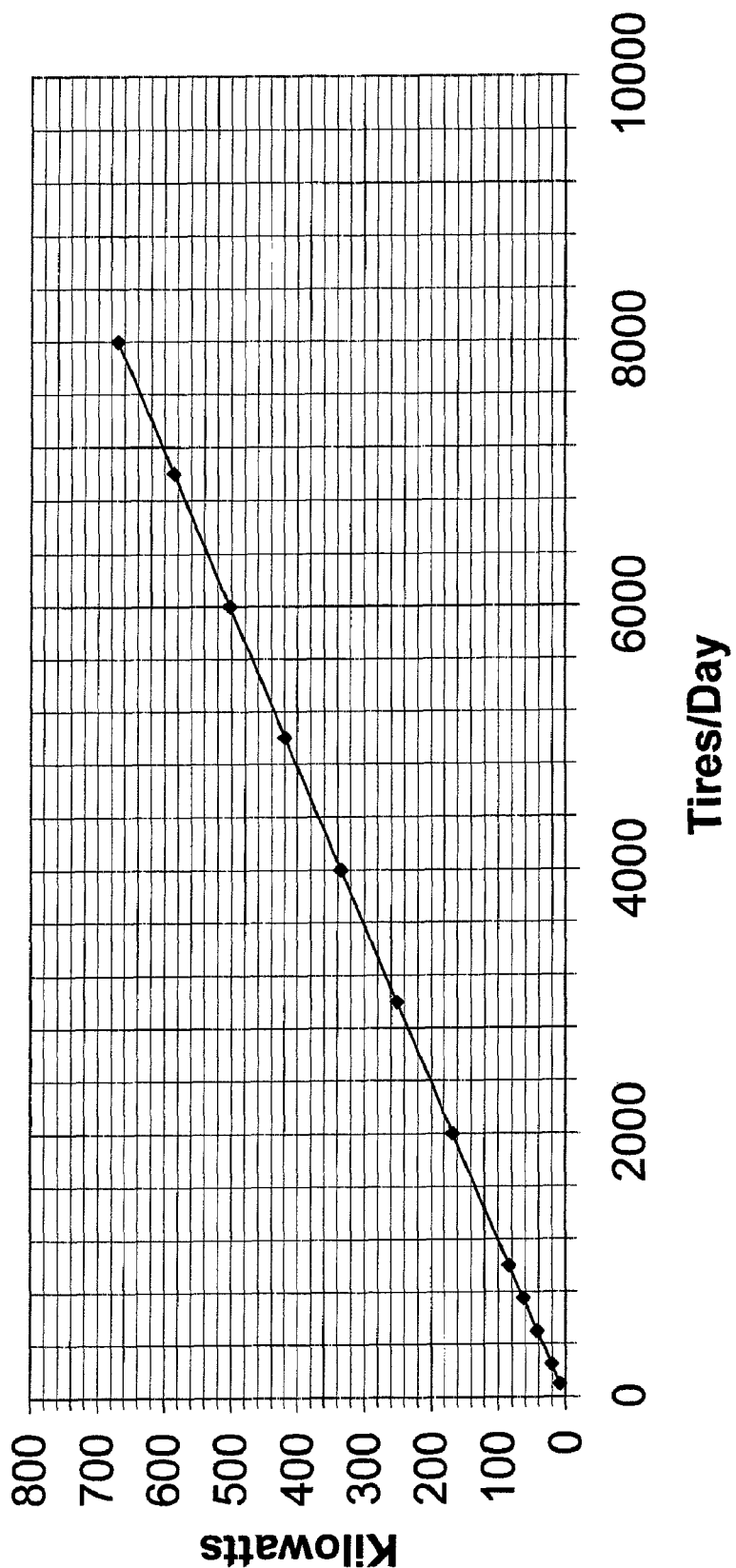

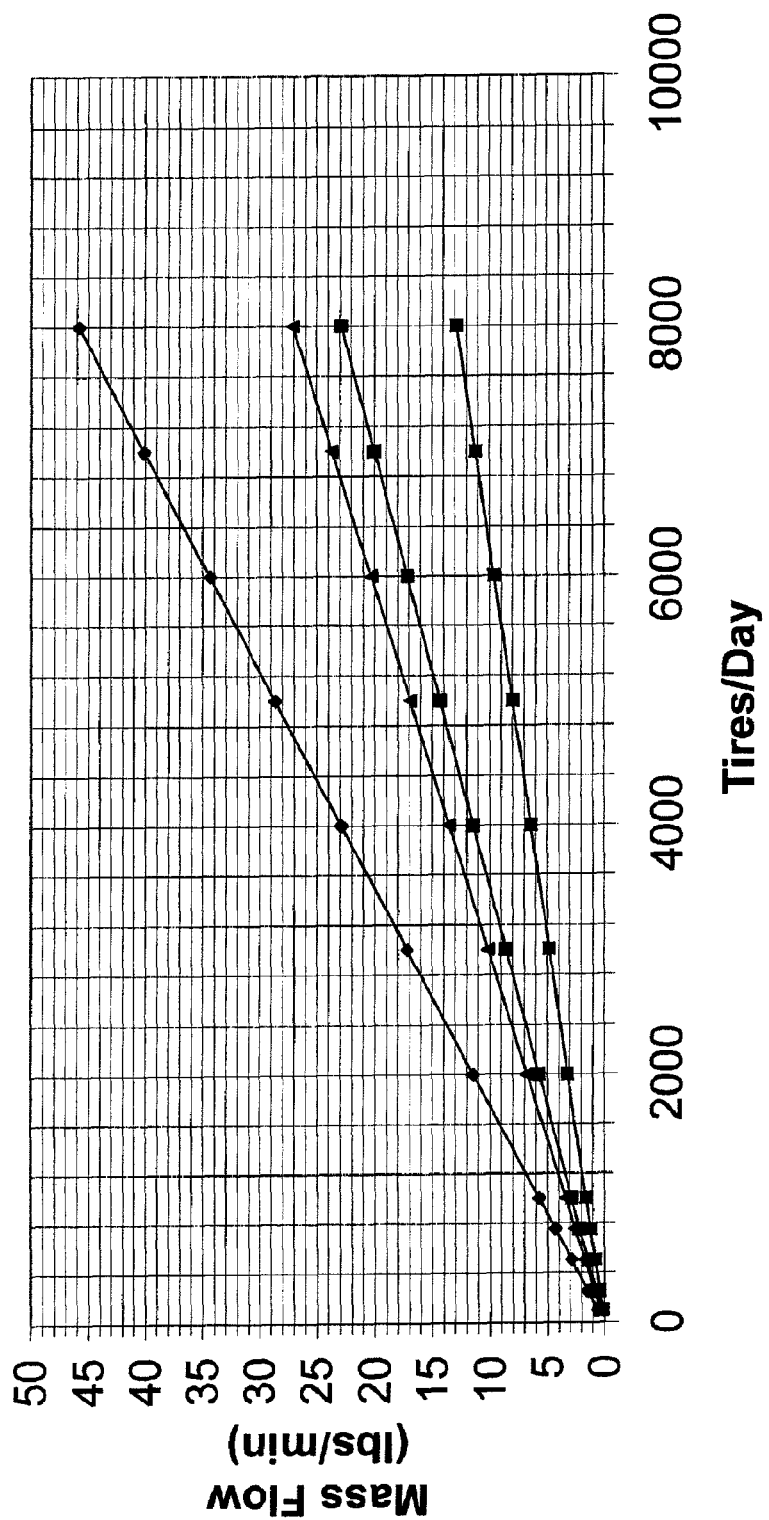
FIG. 8 - Tire By-Products vs. Tires/Day Throughput

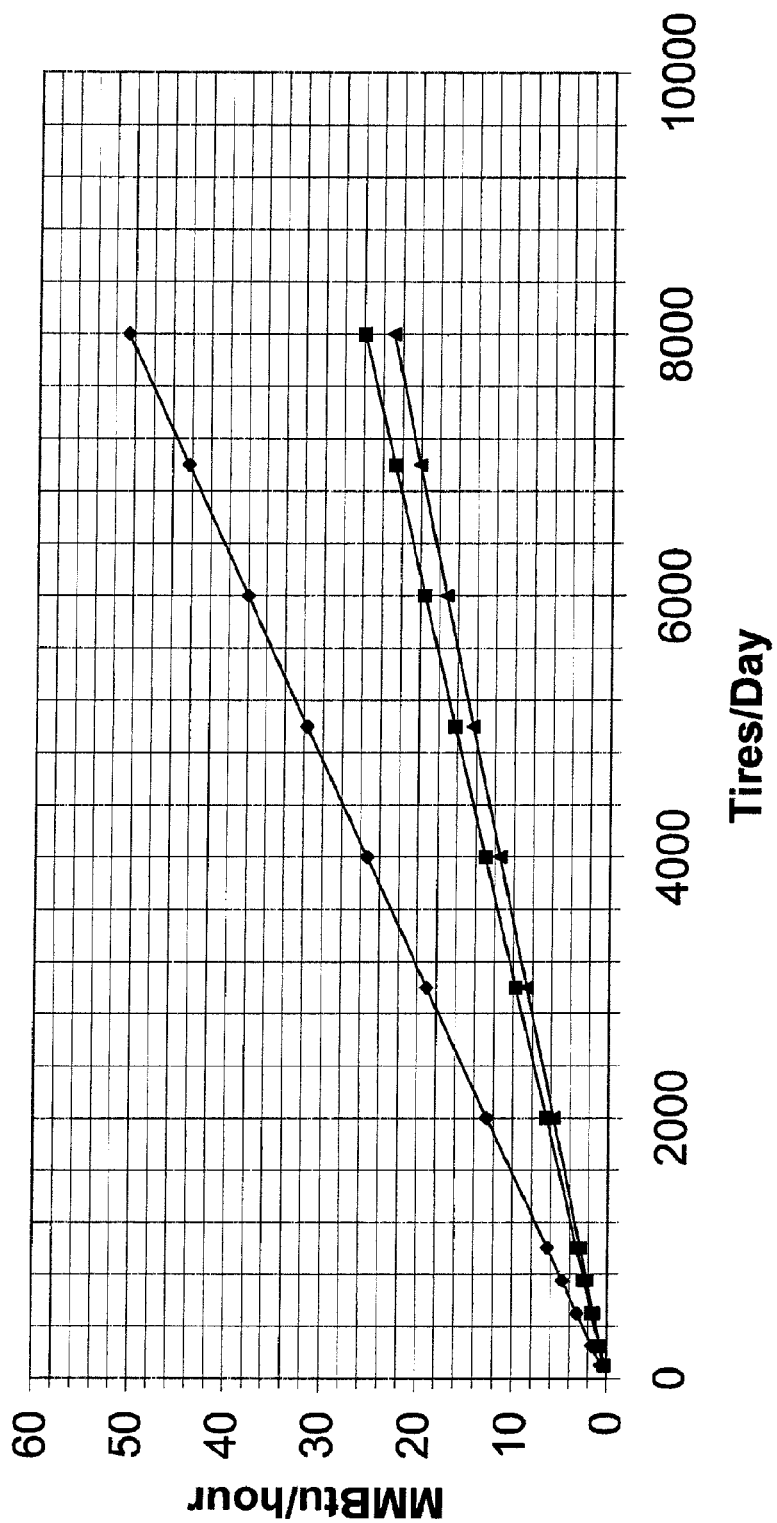

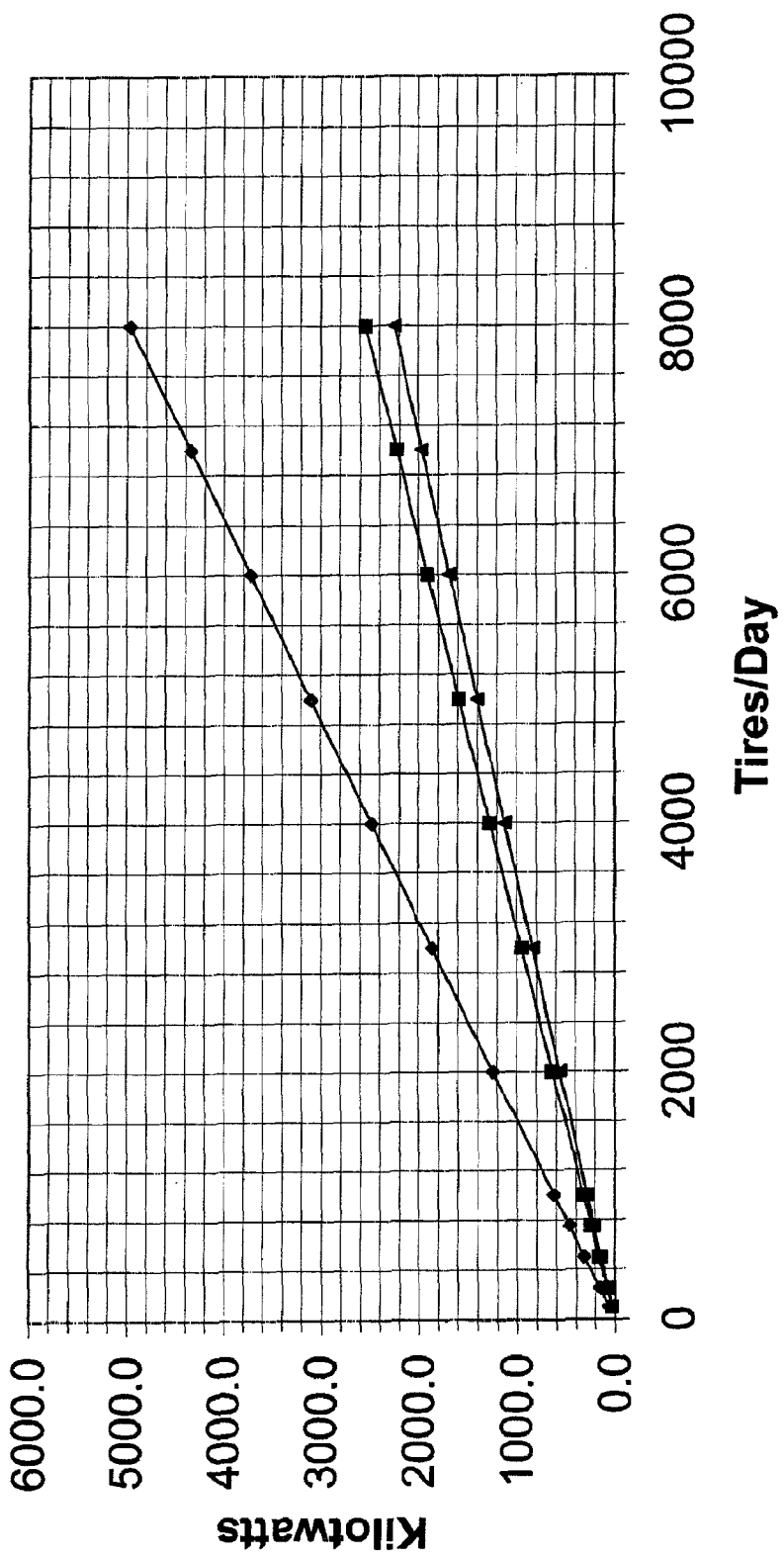
FIG. 10 - Electrical Equivalent Power Produced vs. Tires/Day Throughput

METHOD AND APPARATUS FOR MICROWAVE REDUCTION OF ORGANIC COMPOUNDS

CROSS-REFERENCE TO RELATED APPLICATIONS

This application claims priority to and is a continuation of U.S. patent application Ser. No. 12/731,492 filed 25 Mar. 2010, which is a continuation of U.S. patent application Ser. No. 11/670,041, now U.S. Pat. No. 7,927,465, filed 1 Feb. 2007, which claims priority from U.S. Patent Application Ser. No. 60/825,002 filed 8 Sep. 2006 and U.S. Patent Application Ser. No. 60/766,644 filed 2 Feb. 2006, both provisional applications hereinby incorporated by reference.

TECHNICAL FIELD

The invention described herein pertains generally to a method and apparatus for depropagating polymer-based materials, e.g., plastics, asphalt roofing shingles and rubber, including crosslinked plastics and rubber-based polymers, including cross-linked rubbers such as sulfur-based crosslinks, as used in tires. A decrosslinked, and at least partially depolymerized product is achieved without combustion in a second application, including computer waste and poly-chlorinated biphenyl (PCB), poly-aromatic hydrocarbon (PAH), and/or hexachlorinated benzene (HCB)-laden material. Organic material is dried, sterilized and volumetrically reduced without an external heat source in a third application, including municipal solid waste (MSW), medical waste, and construction waste. Shale oil is driven from rock formations and recovered in a fourth application. Bituminous coal is reduced to carbon, hydrocarbon gases and ash in a fifth application.

BACKGROUND OF THE INVENTION

In the field of petrochemicals, escalating energy costs for oil, natural gas, liquefied petroleum gas (LPG), and liquefied natural gas (LNG) are of increasing concern to those involved in the processing of organic materials, chemicals, and petroleum products. With the inherent aging of the facilities, coupled with the ever-escalating energy and capital equipment costs, refurbishment and replacement costs of these plants becomes increasingly difficult to justify. Many efforts have been expended in those applications described in the Technical Field to produce directly useable fuels from scrap tires or plastics without further treatment, substantially improve throughput, increase operating efficiency, or reduce energy consumption, but have failed due to economic or technical reasons. The present invention achieves all of these objectives through the direct application of high-density microwave energy to various organic materials, while simplifying the process methods and apparatus. The uniqueness of the invention will become immediately apparent through the narrative presented in the Detailed Description of the Invention to those skilled in the art of microwaves, petrochemical, and energy production processes.

SUMMARY OF THE INVENTION

In accordance with the present invention, in one aspect, there is provided a microwave reduction process to more economically produce high quality syngas and liquid fuels, suitable for direct introduction into an Internal Combustion Gas Turbine (ICGT), in the petrochemical, industrial, and energy markets within a specified and controlled range of Btu content, while operating below current emissions levels set forth by the U.S. Environmental Protection Agency (EPA). Alternately, the output heat from the ICGT may be passed through a heat exchanger in a combined cycle application for the production of electricity, steam, or other waste heat applications. The gas turbine is coupled to an electrical generator to provide electricity for this invention. It is important to note that combustion of only the syngas fuel is sufficient to provide the total electrical requirements for the microwave system and ancillary support equipment, plus excess energy is available for export to the electrical grid. All of the recovered liquid fuel, carbon black, and steel are available as a revenue stream to the customer. For clarity and to dispel considerations of a perpetual motion device, it should be noted that the heat potential of a scrap tire is approximately 15,500 Btu/lb (36,053 kJ/kg). The recovered syngas contains approximately 18,956 Btu/lb (LHV) (44,092 kJ/kg), the recovered fuel oil contains approximately 18,424 Btu/lb (LHV) (42,854 kJ/kg), and the recovered carbon black contains approximately 14,100 Btu/lb (32,797 kJ/kg). The typical amounts of recovered by-products through microwave excitation of scrap tires, based on a typical scrap tire mass of 20 pounds (9.072 kg) is given in Table 1. It should be noted that operating conditions, such as applied microwave power, applicator pressure, temperature and residence time will determine the gas:oil ratio derived from the hydrocarbon gases identified in Table 1. Data relevant to gas:oil data is presented in FIG. 8.

TABLE 1

Typical Scrap Tire Reduction By-Products from Microwave Excitation

| | | | |
|---|---|---|---|
| Hydrocarbon Gases: | 11.8992 lbs. | (5.397 kg) | 59.4958% |
| Sulfur as $H_2S$: | 0.0373 lbs. | (0.017 kg) | 0.1865% |
| Chlorine as HCl: | 0.0014 lbs. | (0.001 kg) | 0.0070% |
| Bromine as HBr: | 0.0125 lbs. | 0.006 kg) | 0.0627% |
| Unspecified: Carbon Black: | 4.8712 lbs. | (2.209 kg) | 24.3560% |
| Metal Oxides/Fillers: | 0.8683 lbs. | (0.394 kg) | 4.3415% |
| Plated High-Carbon Steel: | 2.3101 lbs. | (1.048 kg) | 11.5505% |
| Total: | 20.0000 lbs. | (9.072 kg) | 100.0000% |

When the heat content of the various recovered by-products is considered in conjunction with the mass percentages given in Table 1, an energy balance exists between the heat contained within the scrap tire feedstock and the heat recovered from the microwave-reduced scrap tire by-products. A mass balance is also achieved between the tire feedstock and various recovered by-products.

High power density microwave energy has been utilized effectively to reduce polymers through molecular excitation of polar and non-polar molecules, while producing intermolecular heating within low-loss dielectric materials.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 7 is a graph illustrating applied microwave power in kilowatts vs. throughput of scrap tires per day;

FIG. 8 is a graph illustrating by-products recovered from scrap tires vs. applied microwave power in kilowatts;

FIG. 9 is a graph illustrating the thermal energy recovered from scrap tire by-products, at an applied microwave power, as illustrated in FIG. 7; and FIG. 10 is a graph illustrating the equivalent electrical power produced from the thermal energy illustrated in FIG. 7 by an Internal Combustion Gas Turbine (ICGT), operating in simple cycle mode, at a combustion efficiency of only 35%.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The scrap tire material received from the scrap tire processing plant is typically shredded in randomly sized pieces from ½ inch (12.7 mm)×½ inch (12.7 mm) to about 1 inch (25×4 mm)×1 inch (25.4 mm), usually containing all of the steel associated with the scrap tires. Some scrap tire shredders will remove about 60% of the steel, as part of the scrap tire processing for crumb rubber applications. This invention can process shredded scrap tire material with or without the steel Laboratory data indicates that the overall microwave process efficiency increases approximately 10-12% with the reduced steel content in the scrap tire material, due to reduced reflected power, which is more than enough to offset the cost of steel removal during the scrap tire shredding operation.

Figure 1:
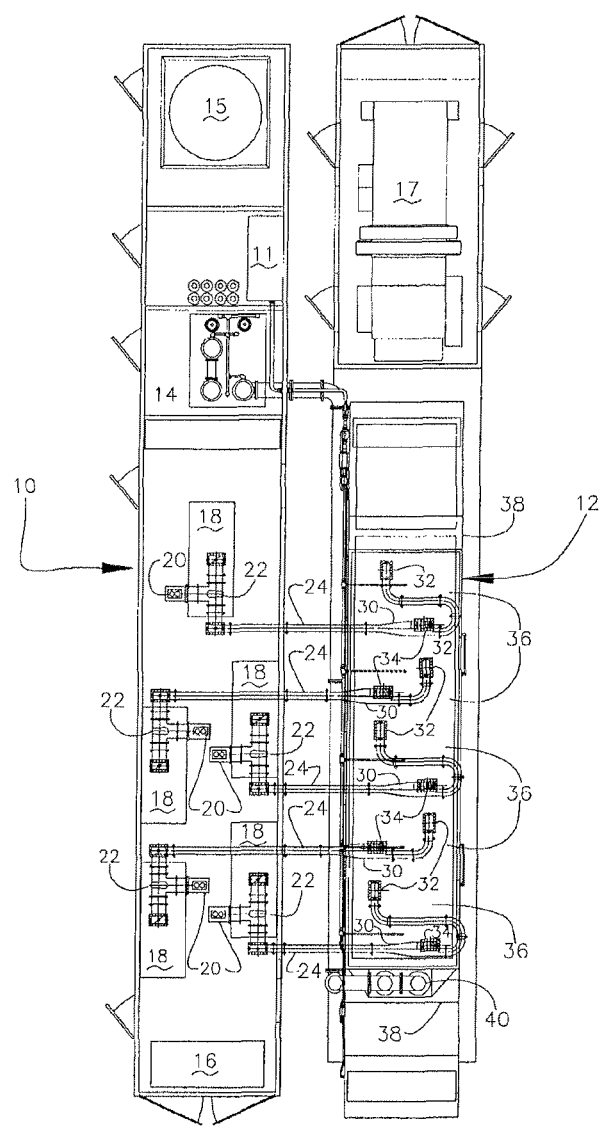
FIG. 1 is a top plan view of a microwave-based reduction system assembly drawing illustrating microwave generators, applicator, chiller, scrubber and nitrogen generator set upon mobile trailers.

As illustrated in FIG. 1, the apparatus includes five (5) major elements (1) a mobile sealed microwave reduction multi-mode applicator 12, coupled to a mobile set of microwave generators 10, (2) a nitrogen generator 11, which displaces any air within the microwave applicator and provides a non-flammable blanketing gas over the organic material under reduction, in this case, scrap tire material, (3) gas process condenser 13, which receives the hydrocarbon vapor stream from the output of microwave applicator, (4) a gas-contact, liquid scrubber 14, which removes 99.99% of the hydrogen sulfide, hydrogen chloride, and hydrogen bromide contaminants, (5) a air-water chiller 15, which provides continuous cooling water to the magnetrons and control cabinets for heat rejection, and (6) an electrical generator 17, sized to provide all electrical energy to the microwave system and ancillary equipment.

Within the mobile set of microwave generators 10, are illustrated five (5) individual microwave generators 18 in continuous electronic communication and controlled by a PLC in the main control panel 16. Each microwave generator has a magnetron 20 and a microwave circulator 22 with water load. The generated microwaves are coupled from each microwave generator 18 to the microwave reduction applicator 12 via rectangular waveguides 26. In the particular microwave reduction system shown in FIG. 1, an exhaust fan 40 is illustrated with associated motor 42 to extract the hydrocarbon vapor from the applicator 12 and convey the vapor stream to the process gas condenser 13.

Figure 4:
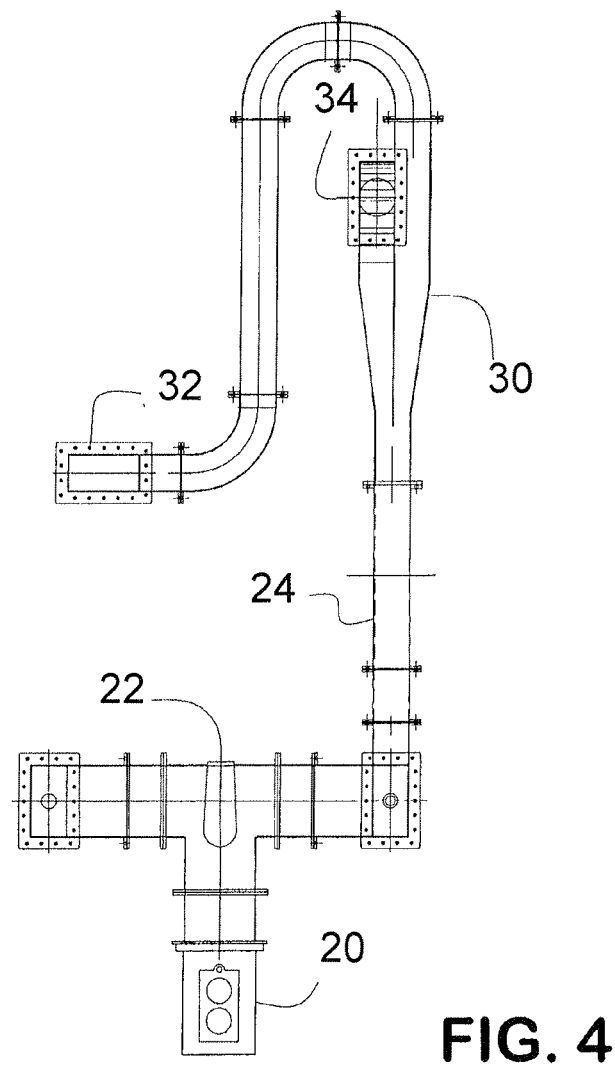
FIG. 4 is an enlarged top view of a bifurcated waveguide assembly.
Figure 5:
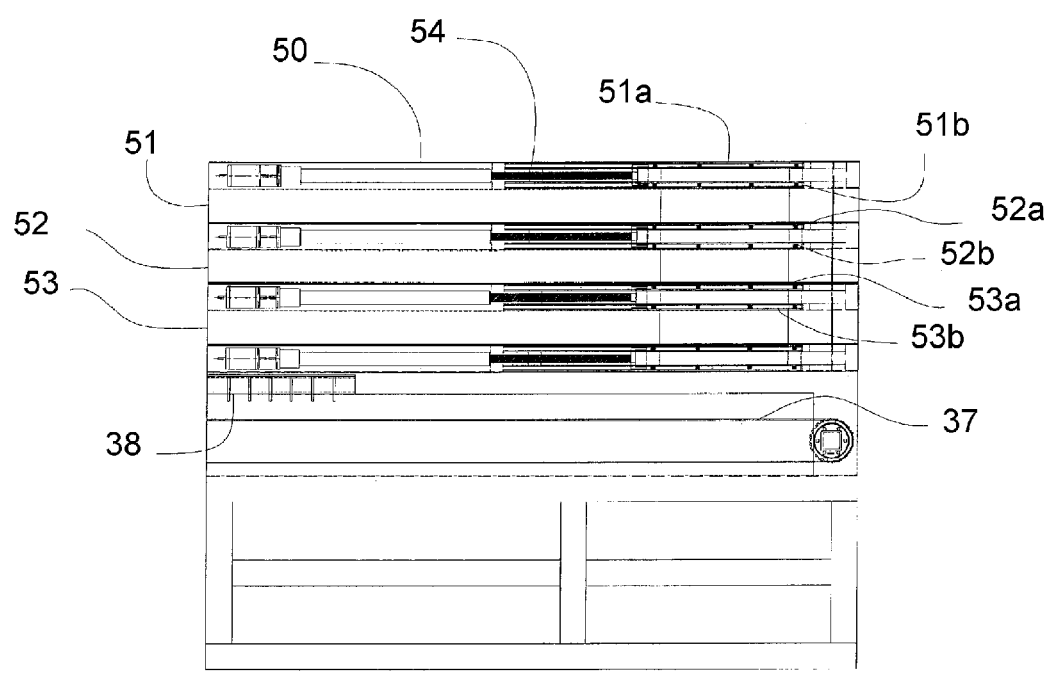
FIG. 5 is a side plan (elevation) view of the infeed assembly.
Figure 6:
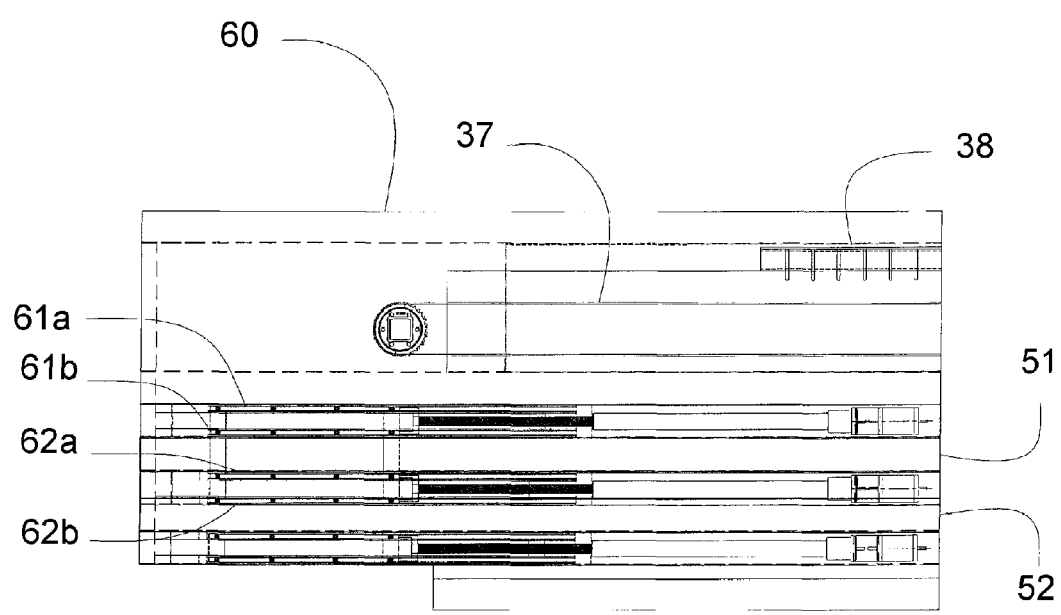
FIG. 6 is a side plan (elevation view) of the outfeed assembly.

Each waveguide assembly 31, which is illustrated in FIG. 4, contains a bifurcated waveguide assembly 30, which directs the microwave energy into specific microwave entry ports 36 in a direction collinear 32 with the longitudinal plane of the applicator conveyor belt 19 and normal 34 to this same longitudinal plane. Microwave leakage outside of the sealed applicator is eliminated by an RF trap 38, consisting of an array of choke pins, designed to a length appropriate for the operating frequency.

Figure 2:
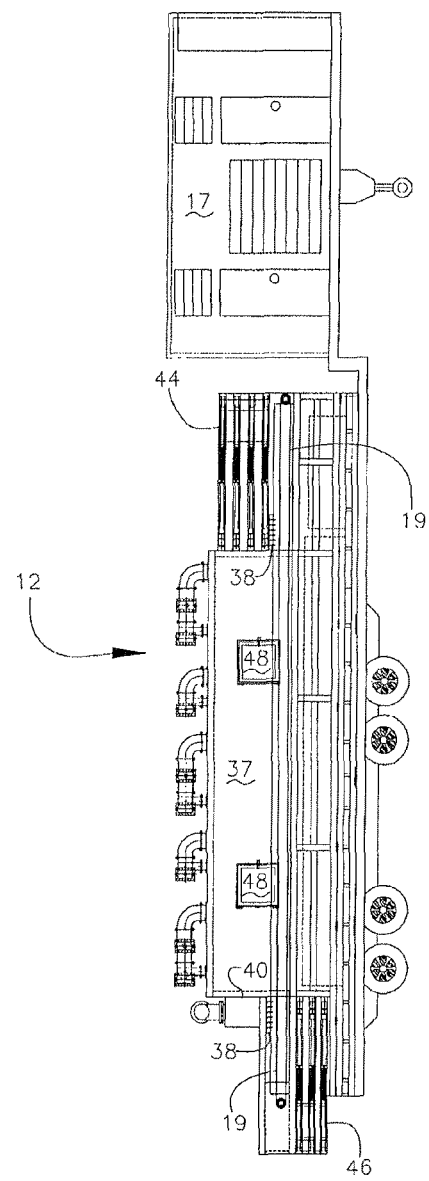
FIG. 2 is a side plan (elevation) view of the microwave applicator trailer showing an infeed assembly, tractor-fed belt, cooling water tanks, diesel fuel day tank, and outfeed assembly.

As illustrated in FIG. 2, the microwave reduction applicator 12 has one entry port 44 and one exit port 46, which are in longitudinal communication with a closed-mesh, continuous, stainless steel belt 19, said belt being of mesh composition, set within a pair of side guides, and having longitudinal raised sides for retention of the sample, said sides being approximately 4 inches (10.16 cm) in elevation. As illustrated, there are two access-viewing ports 48 positioned on each side of the microwave reduction applicator 12. Illustrated in FIG. 1 and FIG. 2 are multiple microwave reduction applicators 12, which are interconnected to form a continuous chamber 37. Each microwave reduction applicator 12 consists of two (2) or four (4) waveguide 36 entry ports, depending on the specific application and the microwave power required for the application. While a total of three (3) applicators 12 are shown, there is no need to limit the invention to such, as both larger and smaller numbers of applicators 12 necessary to arrive at an application-specific chamber 37 length, are envisioned to be within the scope of the invention. In fact, the invention works with only one (1) applicator chamber 37, with only 2 entry ports.

The microwave energy is coupled from the microwave generator 10 to the applicator via a rectangular waveguide assembly 31 and exits the same through a bifurcated waveguide assembly 30. The source of the microwave energy is a magnetron, which operates at frequencies, which range from 894 MHz to 2450 MHz, more preferably from 894 MHz to 1000 MHz, and most preferably at 915 MHz+/−10 MHz. The lower frequencies are preferred over the more common frequency of 2,450 MHz typically used in conventional microwave ovens due to increased individual magnetron power and penetration depth into the organic material, along with an increase in operating efficiency from 60% in the case of 2450 MHz magnetrons, to 92% for 915 MHz magnetrons. Each magnetron has a separate microwave generator control panel in electronic communication with a main control panel for system control.

Figure 3:
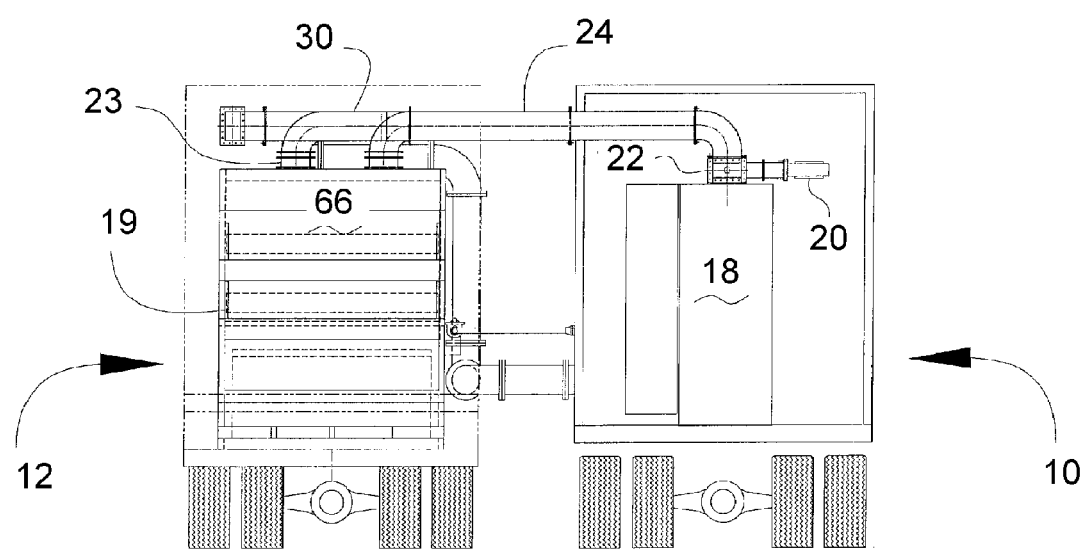
FIG. 3 is a rear plan view of the assembly of FIG. 1.

As shown in FIG. 3, the microwave reduction applicator has an active area, whose boundaries are set by the interior roof sheets 21 and the stainless steel belt 19. For the applicator described in this invention, the active microwave reduction chamber height is 24 inches (60.96 cm). It is well known how to appropriately size the active area of the microwave chamber 37. The belt 19 traverses through the active area between two (2) continuous guides 21, whose open dimension is sufficient for the belt 19 to pass, but is not a multiple or submultiple of the microwave frequency. The height of the guides 21 is a nominal 4" (10.16 cm), which will contain the material on the belt 19. The closed-grid belt provides the lower reference, which becomes the bottom of the active area of the applicator.

In the event that the microwave energy is not absorbed by the organic material, a condition, which results in reflected microwave energy, this energy is redirected by a device known as a circulator 20 and subsequently absorbed by a water load 22. The circulator is sized to absorb 100% of the microwave energy generated by the magnetron. Each magnetron transmits its energy via a waveguide 24 through a quartz pressure window assembly 23, into the series-connected microwave reduction chamber(s). The quartz pressure window assembly 23 includes two flanges separated with rectangular waveguide, one (1) wavelength long, each flange containing a milled recess to accept a ¼" thick fused quartz window, which is microwave-transparent. The quartz pressure window assembly 23 is installed between the waveguide 24 and either microwave entry port 32 or 34 into the applicator chamber 37 to contain the pressure within the microwave reduction chamber and prevent any potentially hazardous gas from entering the waveguide system back to the microwave generator 10. The quartz pressure windows assembly 23 is pressurized with nitrogen from the nitrogen generator 11, and referenced to the internal microwave reduction chamber pressure. This insures that excess pressure cannot build up on the reduction chamber side of the quartz window assembly, resulting in a failure of the quartz window, and, with the introduction of air into the reduction chamber, create a fire or explosion hazard. In a preferred embodiment, each microwave generator operates at a center frequency of 915 MHz+/−10 MHz. In an expanded view in FIG. 4 this microwave energy is coupled from the microwave generator, through a bifurcated waveguide assembly, into the applicator chamber 37 via two (2) waveguides 32,34, which serve as rectangular conduits into each applicator chamber 37.

The waveguide entry into this applicator is via a three-ported bifurcated waveguide assembly 30, which equally divides the electromagnetic wave of microwave energy prior to the two-plane entry into the top of the applicator chamber, while maintaining electric field dominance, The waveguide 32,34 inputs to the applicator chamber 37 from the bifurcated waveguide assembly 30 are in the same plane on the top of the applicator 37, but one waveguide plane 32 is oriented along the x-axis, while the other waveguide plane 34 is oriented along the y-axis. The split waveguide assemblies illustrated in FIG. 4 are designed so as to produce microwaves, which are essentially 90° out of phase. This results in the generation of multiple modes of microwave energy within the applicator chamber 37 and elimination of the requirement for mode stirrers, while providing a more uniform distribution of the microwave energy throughout the applicator 12.

The microwave energy is produced by the microwave generator and transmitted into a WR-975 standard rectangular waveguide, fabricated from high-conductivity, low-loss 1100S aluminum, instead of the more conventional 6061 aluminum. The choice of low-loss aluminum results in less losses throughout the waveguide system from the microwave generator output to the microwave reduction chamber inputs.

Generally, when mobile units are desired, with the microwave generators mounted on one trailer and the applicator mounted an adjacent trailer, it is customary to accomplish coupling of the microwave energy between the two trailers via a ribbed, flexible waveguide assembly. However, there is also a tendency for those performing field alignment of the two trailers to bend the flexible waveguide beyond its specified limits of +/−0.010 inches (0.254 mm), resulting eventually in a crack or fatigue failure of the flexible waveguide assembly. Failure of any joint in the waveguide assembly will cause microwave leakage into the surrounding area, resulting in a hazard to personnel and potentially interfering with communications equipment. It is understood that flexible waveguides may be used for this application, but are not shown in the drawings.

The microwave energy exits the microwave generator trailer and enters a bifurcated waveguide assembly 30, which is illustrated in FIG. 4. One output connects to a right angle waveguide section, from which the microwave energy enters directly into the microwave chamber 37. The other output is presented to a two-section, long-radius, right angle waveguide section, which accomplishes the turning of the microwave energy path 180°, while maintaining electric field dominance. The microwave energy enters a short straight section and another long-radius, right angle waveguide section. The microwave energy is then coupled into a right angle waveguide section and enters through the quartz pressure window assembly 23 directly into the microwave reduction chamber 37.

Although the waveguide entries 32, 34 into the applicator reduction chamber 37 are in the same plane on the top of the applicator 12, the orientation of the two waveguide entries 32 and 34 relative to the centerline of the applicator, is 90° to each other. One waveguide entry section to each applicator entry point is parallel to the flow of the organic materials, while the other is perpendicular to the flow of the organic material. The other significant feature of this design is that the distance from the output from the bifurcated waveguide, which couples the microwave energy to the applicator entry point parallel to the flow of the organic material, is physically much longer than the output feeding the perpendicular port. This additional length results in a different characteristic impedance at the microwave chamber entry point, a time delay in the microwave energy reaching the applicator entry point, and a relative phase shift in the energy wave itself. As stated previously, the microwave generator operates at a center frequency of 915 MHz+/−10 MHz. At this frequency, the effects of additional waveguide lengths and bends present a very noticeable change in the time/phase relationships due to the impedance mismatch. The impedance mismatch results in a phase shift of 90 electrical degrees. The significance of the 90° phase shift manifests itself in the type of polarization present in the microwave reduction chamber. Each microwave input from the bifurcated waveguide assembly is a linear polarized wave. When two linear polarized waves, separated in time quadrature by 90°, circular polarization occurs. In this invention, the impedance mismatch, phase shift in microwave inputs to the applicator, and resulting circular polarization, along with the chosen frequency of operation, is a significant contribution to the microwave energy mixing within each microwave reduction chamber, allowing more even microwave energy distribution throughout the entire applicator.

Microwave reduction occurs in a continuous mode, as opposed to a batch mode, and organic material is continuously, but synchronously, entering and exiting the microwave applicator. During the entry and exit times, it could be possible that microwave energy could propagate into the surrounding area, resulting in a possible hazard to personnel and create radio frequency (RF) interference. To prevent leakage of microwave energy from the active area of the microwave applicator, a device known as an RF trap 38, containing a matrix or array of grounded ¼-wavelength RF stubs (antennae), with ¼-wavelength spacing between the RF stubs in both the x-plane and y-plane, are installed at each end of the applicator to insure attenuation of microwave energy for compliance with leakage specifications of <10 mW/cm$^2$ maximum for industrial applications and <5 mW/cm$^2$ maximum for food applications.

The active area in the microwave chamber consists of a rectangular cavity, measuring 8 feet long (2.44 meters)×4 feet (1.22 meters) wide×2 feet (0.61 meters) high, designed specifically for the microwave energy coupled from one (1) or two (2) microwave generators. This is referred to as a microwave reduction chamber or one applicator module. Multiple microwave reduction chamber modules may be connected together to form an applicator. FIG. 1 illustrates a microwave reduction applicator which includes three (3) microwave reduction chambers, which receive microwave energy from five (5) microwave generators and five bifurcated waveguide assemblies, which result in ten (10) sources of microwave energy to the applicator and even more uniform microwave energy distribution. The applicator also contains a continuous, self-aligning, closed mesh, 4 feet (1.22 meters) wide, Type 304 stainless steel belt 19, which transports the organic material into the applicator at the entry port 44, through the active area of the applicator 45, and out of the exit port 46.

Just as the applicator 12 and the microwave 10 are chosen to accommodate a specific throughput of scrap tire material equivalent to 100-8,000 tires per day, the infeed 50 and outfeed 60 assemblies, along with the microwave reduction chamber 37 are also sized volumetrically to process the specified amount of material. As this invention is capable of operating in continuous mode, as opposed to batch mode, the feed systems operate independently, yet synchronously with the movement of the material on the belt 19 though the applicator reduction chamber 37.

Initially, the applicator reduction chamber 37 is purged with five (5) volumes of nitrogen gas to displace any air within, and is maintained in a slightly pressurized state, approximately 0.1 psig (0.689 kPa) above local atmospheric pressure. This insures that no air migrates into the applicator reduction chamber 37 during opening of either infeed 50 or outfeed 60 shutter systems. Since the applicator is slightly pressurized, nitrogen will flow toward the sealed shutter assemblies, instead of air flowing into the microwave reduction chamber. With reference to FIG. 3 and FIG. 4, the microwave reduction chamber is open to the bottom slide 53b of shutter 53 and the top slide 61a of shutter 61. If any seal leakage occurs at the shutter interface, the nitrogen direction of flow is always from the applicator into the shutter assembly. At startup, all slides on infeed shutter system 50 and outfeed shutter system 60 are closed.

The infeed system 50 includes three sliding shutter assemblies, 51, 52, and 53. The sequence of operation is as follows: Initially, nitrogen gas is applied to infeed shutters 51, 52, and 53 until five (5) volumes have been purged through the shutters to atmosphere. The top slide 51a of shutter 51 opens and receives material from an optional hopper or external conveyor belt. The bottom slide 51b of shutter 51 remains closed. Dependent upon desired throughput, the load cell 54 under the top slide allows material to enter shutter 51 until the prescribed amount of material has been deposited. At this time, the top slide 51a closes and nitrogen purge gas is applied to shutter 51. After five (5) volumes of nitrogen have purged shutter 51, the bottom slide 51b opens, along with slide 52a of shutter 52, located directly below shutter 51. After the material drops through from shutter 51 into shutter 52, the bottom slide 51b and top slide 52a close. After five (5) volumes of nitrogen have purged shutter 52, the bottom slide 52a opens, along with slide 53a of shutter 53, located directly below shutter 52. After the material drops through from shutter 52 into shutter 53, the bottom slide 52b and top slide 53a close. After five (5) volumes of nitrogen have purged shutter 53, the bottom slide 53b opens, and the material drops onto conveyor belt 37. Conveyor belt 37 transports the material beneath the RF trap's 38 array of choke pins into the active area of the microwave reduction chamber. Based upon the type of material, throughput required, and microwave power applied, the conveyor belt 37 transports the material through the applicator 12 at a preset speed.

The outfeed system 60 includes two sliding shutter assemblies, 61 and 62. The sequence of operation is as follows. Initially, nitrogen gas is applied to outfeed shutters 61 and 62 until five (5) volumes have been purged through the shutters to atmosphere. When belt 37, along with its reduced material reaches the outfeed shutter system, nitrogen purge gas is applied to outfeed shutter 61 to displace any air. The top slide 61a of shutter 61 opens and the reduced material drops from conveyor belt 37 into outfeed shutter 61. The bottom slide of shutter 61b remains closed. After the material drops from the belt into shutter 61, the top slide 61a closes. Nitrogen purge gas is applied to shutter 62 until five (5) volumes have been purged through shutter 62 to displace any air. Then, the bottom slide 61b of shutter 61 and the top slide 62a of shutter 62 open, and the material falls into shutter 62, located directly below shutter 61. When all of the material has dropped into shutter 62, the bottom slide 61b of shutter 61 and the top slide 62a of shutter 62 closes. Nitrogen gas is applied to shutter 63 until five (5) volumes have been purged through shutter 63. Then the bottom slide 62b of shutter and the top slide 63a of shutter 63 open, and the material falls into shutter 63, located directly below shutter 62. Finally, the bottom slide 63b of shutter 63 opens and the reduced material drops into an optional grinder, onto an external conveyor belt, into an optional hopper, or is removed by a vacuum system to a storage area. Sequencing of the infeed system, conveyor belt speed control, outfeed system, magnetrons and nitrogen purge gas system is under PLC program control at all times. An alternate infeed and outfeed system includes a nitrogen-purged, multiple-chamber rotary airlock system.

The internal walls of the applicator are made from either low-loss 1100S aluminum plate or Type 304 stainless steel, depending upon the application. High temperature applications in excess of 900° F. (482° C.) and corrosive atmospheres require the use of Type 304 stainless steel. Microwave reduction of scrap tires results in an equilibrium temperature occurring at 680° F. (360° C.) in a relatively non-corrosive atmosphere, therefore, 1100S aluminum plate is the material of choice. In microwave reduction applications such as plastics, particularly polyvinyl chlorides (PVC), hydrochloric acid is produced in voluminous amounts, contributing to surface corrosion, as well as stress corrosion cracking; therefore, Type 304 stainless steel is preferred The type of gaskets used around the microwave viewing/access doors 48 for gas containment requires a round silicone gasket for non-corrosive atmospheres or a Teflon-enclosed epoxy gasket for corrosive atmospheres. In either application, a carbon-filled Type 304 stainless steel mesh gasket is used for microwave containment around the viewing/access doors 48. The hydrocarbon gases exit through a transition plenum duct from a rectangular cross-section at the applicator to a circular cross-section to accommodate a ten (10) inch (25.4 cm) pipe containing a tee, whose branch is connected to a rupture disk 44 rated at 15 psig (103.4 kPa), and a rotary-disk butterfly valve 41. The applicator discharge valve 41 serves to control the applicator static pressure, which is the result of the hydrocarbon gases generated during microwave reduction of the organic materials plus nitrogen purge gas.

The five (5) microwave generators, as shown in FIG. 1, consist of five (5) magnetrons, each rated at 100 kW, five (5) circulators with water loads, each rated at 100% power generated by their respective magnetrons, and five (5) switched-mode power supplies (SMPS), which contain all power and control signals, along with metering for the magnetrons and control electromagnets, plus digital and analog interfaces to the Programmable Logic Controller (PLC). The SMPS operates at a typical efficiency of 91%, and eliminates the less efficient, heat-producing power transformer, along with the six-phase bridge rectifier assembly, SCR controllers, filtering, and associated wiring. The additional benefit of the SMPS is that, in the event of an immediate shutdown, the output voltage of the SMPS almost immediately (<10 mS) decreases to zero (0) volts. However, in the case of the transformer power supply, the internal capacitance between the transformer windings, can store a lethal voltage for several hours. The other undesirable effect from the transformer power supply is that after a shutdown, the stored charge within the transformer can cause the magnetron to operate outside its rated operating envelope and cause premature magnetron failure.

The PLC provides metering, sequencing and control of the microwave generator, conveyor motors and applicator controls. The only additional requirement is cooling water in the amount of 5 gallons per minute (18.93 liters/minute) per 100 kW magnetron and 3 gallons per minute (11.35 liters per minute) per circulator water load. Each microwave generator is a two-door enclosure with front and rear door access, measuring 48 inches (1.22 meters) long×84 inches (2.13 meters) high×24 inches (0.61 meters) deep, which is a footprint reduction from conventional microwave generator systems.

To process additional material or increase the throughput, one may add additional microwave generators, microwave applicator modules, increase belt speed, or increase the organic material bed depth proportionally. For small variations in the power requirement due to slight inconsistencies in the material being processed, the belt speed may be adjusted to change the dwell or residence time of the organic material within the applicator. Belt speed control is accomplished by changing the conveyor speed setpoint on the touchscreen, mounted on the front of the Main Control Panel, adjacent to the line of microwave generator panels, as illustrated in FIG. 1.

It has been determined that the process characteristics relative to throughput and power consumption are linear from minimum to maximum throughput. For example, energy consumption during microwave reduction of scrap tires at 915 MHz is 1.80 kW-hr per tire from 100 tires per 8-hour shift to 8,000 tires per 24-hour day, when utilized with an appropriate applicator length, bed depth and microwave power level. This invention allows the addition of microwave generators and relative appurtenances in sets of six, along with an extension of the applicator as dimensionally defined above.

The standard design, which supports the majority of organic material reduction processes with high power density microwaves, contains three (3) microwave modules per applicator. Through careful design, this modular concept may be extended to include a maximum of 80 microwave generators or 16 modules within one applicator, in a stationary design.

In one aspect of the invention, the design of the unit is a mobile demonstration unit, with the microwave generators and control cabinets, along with the Main Control Panel, scrubber, nitrogen generator and chiller mounted in one trailer and the microwave applicator assembly and electrical generator mounted on an adjacent trailer.

Microwave system control is accomplished by the use of a Programmable Logic Controller (PLC) with Digital and Analog Input/Output (I/O) Modules and a Data Highway to a Remote Terminal Unit (RTU), which are all mounted in the Main Control Panel (MCP). The RTU is also known as an Operator Interface Terminal (OIT), as the touchscreen on the OIT is the operating interface to the microwave reduction system. PLC communications modules are mounted in each microwave generator enclosure, which permits continuous bidirectional communication between the PLC and the OIT or touchscreen. The PLC program provides continuous sequencing, monitoring and control functions in real time. The PLC program also communicates along a data highway to display alarm/shutdown status and operating parameters on the touchscreen The touchscreen provides multiple displays in both digital and analog formats in real time. The summary status touchscreen indicates power output, reflected power, anode current, anode voltage, filament current, electromagnet current, generator cabinet temperatures, applicator temperatures and pressures, internal and external water temperatures, hydrocarbon vapor flow rates, process operating curves, PID control loop status, and parametric data from the nitrogen generator, chiller, process condenser, and scrubber, all in real time.

Additional magnetron protection is insured by a directional coupler system, which monitors forward and reflected power, and de-energizes the high voltage to the magnetron in the event of sensing more than 10% reflected power. An arc detection system further protects the magnetron, three-port circulator, and waveguide by de-energizing the high voltage upon detection of arcing within the applicator. Fire detection within the applicator includes infra-red (IR) sensors, smoke detection and rate-of-rise temperature detectors plus combustible gas detectors adjacent to the applicator, which are all wired in series with the safety shutdown system. A multiple-bottle nitrogen backup system serves as a deluge system in the event of a fire, plus provides nitrogen backup, in the event of a nitrogen generator failure.

Any shutdown parameter, which exceeds its preset limit, initiates an immediate shutdown of the high voltage system, and enables the safety shutdown system to proceed through an orderly and controlled shutdown. The safety shutdown system includes both fail-safe hardwired circuitry and PLC shutdown logic, along with local and remote emergency stop buttons to insure maximum protection for operating and maintenance personnel and equipment. Microwave access/viewing doors, microwave generator doors, and power supply enclosure doors are provided with fail-safe, safety switches, which are interlocked with the PLC program, and monitored during microwave operation to protect operating and maintenance personnel from exposure to microwave energy and shock hazards.

Further, the applicator access/viewing doors contain slotted ¼-wavelength chokes and dual fail-safe safety switches, interlocked with the PLC program to immediately (10 mS) switch off the high voltage, in the event of opening during operation. Switching off the high voltage immediately suspends magnetron operation, and hence eliminates any output of microwave energy. Other safety equipment integrated into this invention include a dual-keyed, fused manual disconnect for the main power source from the electrical generator or the customer's utility and a high speed molded case breaker, with electrical trip and shunt voltage trip tied to the shutdown system. Finally, a copper ground bus bar dimensioned 24 inches (0.61 meters) long×2 inches (5.08 cm) high×¼ inch (6.35 mm) thick is provided to insure absolute ground integrity from the main power source to all equipment included with this invention.

PLC programming utilizes standard ladder logic programming, reflecting hardwired logic for digital inputs and outputs, whose logic functions are programmed with Boolean expressions. Special function blocks, including preset setpoints, are used for analog inputs and outputs. The emergency shutdown switches are normally closed (push to open), the low level switches must reach their setpoint before operations may be sequenced, and the high level switches will open upon exceeding their setpoint. Any open switch in the series shutdown string will cause the master shutdown relay to de-energize, which results in de-energizing the high voltage circuits and forces the PLC to execute an immediate, sequential, controlled shutdown.

The best mode for carrying out the invention will now be described for the purposes of illustrating the best mode known to the applicant at the time of the filing of the application. The examples are illustrative only and not meant to limit the invention, as measured by the scope and spirit of the claims.

A summary of recorded data from microwave excitation of scrap tire material is presented in Table 2. All data were the result of exposing shredded scrap tire material to high-power density microwave energy in an approximately one cubic meter (1 m$^3$), stainless steel applicator, fed by microwave inputs from three (3) magnetrons, each capable of generating 3 kW of microwave power at approximately 50% efficiency and operating in batch mode at 2450 MHz. Variations in the output gas compositions, as well as the amounts of gas and oil, were the result of varying the applicator pressure and hydrocarbon vapor residence time. Variations in the applicator pressure and hydrocarbon vapor residence time were the result of varying the position of the applicator output valve. It was observed that higher applicator pressure (2-10 psig) (13.8-6.9 kPa) and lower flow produced a longer hydrocarbon vapor residence time, which resulted in production of more paraffins, less olefins, less arenes and naphthenes, and subsequently less oil. Conversely, lower applicator pressure (0.1-1.0 psig) (0.69-6.9 kPa) produced a shorter hydrocarbon vapor residence time, which resulted in production of less paraffins, more olefins, more arenes and naphthenes, and subsequently more oil.

Applicator pressure was set statically during the nitrogen purge cycle at the beginning of each test between 0.1 and 0.5 psig (0.69-3.45 kPa). Steady-state temperatures reached at equilibrium, occurred at approximately 680° F. (360° C.), with a hydrocarbon vapor residence time of approximately 285 milliseconds (mS).

To verify the effects of pressure, temperature and residence time on the gaseous and liquid fuels produced, pressure within the applicator was increased to a level between 1.0 and 10.0 psig (6.9-69 Pa) by adjusting the applicator discharge valve position closed between 100 and 50% of stroke, respectively. The corresponding pressure setup changes produced a new steady-state temperature, which stabilized in a range of 842-680° F. (450-360° C.), along with a corresponding change in the hydrocarbon vapor residence time within the applicator in a range of 400-80 milliseconds, respectively. Applicator pressure, temperature, and hydrocarbon residence time varied inversely with the closing stroke (less open) of the applicator discharge valve.

These parametric process changes produced oil:gas ratios from ~10% Oil:90% Gas to ~90% Oil:10% Gas, The microwave test data in Table 2 provides an insight into the possible variations of output fuel (oil:gas) ratios from scrap tires. As the primary objective of the test was to maximize the production of high-Btu syngas, the majority of the test data exists at the oil:gas ratio of 25% Oil:75% Gas, Representative data points are given in Table 2, which illustrate process output fuel ratios throughout the ranges stated above. In addition, these data have been extrapolated for several variations of oil:gas ratios throughout the stated ranges, in order to produce the operating performance graphs illustrated in FIG. 7, FIG. 8, and FIG. 9. These graphs can be utilized to determine an indication of selected operating points.

At the elevated pressures, temperatures, and increased residence times, the amount of butane is significantly reduced, resulting in an increase in propane, and subsequently ethane. There were no olefins, arenes, or naphthenes present in the syngas produced. As a result of minimal olefins and aromatics in the hydrocarbon vapor stream before the condensor, the amount of oil is also minimal. Through monitoring of the syngas stream after the scrubber with a gas chromatograph, it is apparent that increased pressure within the applicator causes a direct effect on equilibrium temperature, gas residence time, but an inverse effect of the amount of butane.

The reduced amount of butane, and propane for that matter, in the syngas, provides a wider selection of commercially available Internal Combustion Gas Turbines (ICGT's) for combustion of the syngas. The high-Btu syngas heat value and its relation to a choice of an ICGT is only an issue if the syngas application is gas production or cogeneration of electricity. For sales gas purposes, recovery of the butane and propane from the syngas provides an additional revenue stream for the client. Regardless of the application, increasing the residence time in the applicator is a more cost-effective method to reduce the butane and propane, than to incorporate a gas stripper system in the microwave-based tire reduction process.

The conclusions concerning applicator pressure effects on temperature and hydrocarbon vapor residence time, along with types of by-products formed, were confirmed by a four-channel Gas Chromatograph (GC), employing a dual oven, with two (2) Flame Ionization Detectors, (FID), one (1) Thermal Conductivity Detector (TCD), and one (1) Electron Capture Detector (ECD). Separate 100-meter capillary columns were installed in each oven. The gas chromatograph carrier gas was high-purity hydrogen ($H_2$). Adjustable pressure reducing regulators with pressure gauges, were installed on all gas cylinders. Stainless Steel, Type 304, tubing was installed between the gas ports on the applicator and the gas chromatograph.

The applicator contained dual inlet ports for purge gas high-purity nitrogen $N_2$, and one inlet port each for high-purity hydrogen ($H_2$) (reducing gas), and plasma enhancing/purge gas high-purity argon (Ar). A direct-reading bubble-type flowmeter was installed on the applicator at the purge gas inlet and a turbine-type mass flowmeter was installed in the applicator exhaust gas outlet piping after the discharge valve.

Other tests that were conducted, using this same microwave reduction system, included utilization of nickel (Ni), platinum/molybdenum (Pt/Mo), and zeolite catalysts to observe the enhanced reduction of the heavier hydrocarbons contained in the hydrocarbon vapor stream. In another series of tests, Argon was introduced into the applicator to observe the highly, energetic reactions created by the microwave-generated plasma. Catalytic conversion, plasma generation, and free-radical reduction of organic compounds through microwave excitation, will be addressed separately. Microwave-generated plasma in conjunction with catalyst-enhanced reduction resulted in increased product yields of syngas, with characteristics more similar to natural gas than process gas, with improved efficiency.

TABLE 2

Shredded Scrap Tire Reduction Test Results at 2450 MHz

| Test No. | Initial Mass (lbs) | Final Mass (lbs) | Mass Change (lbs) | Mass of Oil (lbs) | % Oil | Mass of Gas (lbs) | % Gas | MW Pwr. (kW) | Total Time (hr) | kW-hr/Tire |
|---|---|---|---|---|---|---|---|---|---|---|
| 1  | 7.998  | 6.614  | 1.384 | 0.327 | 23.63 | 1.057 | 76.37 | 6.6 | 1.912 | 1.58 |
| 2  | 10.000 | 8.102  | 1.898 | 0.794 | 41.83 | 1.104 | 58.17 | 8.2 | 1.833 | 1.50 |
| 3  | 10.163 | 8.201  | 1.962 | 0.576 | 29.36 | 1.386 | 70.64 | 9.0 | 1.750 | 1.55 |
| 4  | 8.579  | 6.693  | 1.885 | 0.316 | 16.76 | 1.569 | 83.24 | 9.0 | 2.133 | 2.24 |
| 5  | 8.512  | 6.449  | 2.063 | 0.325 | 15.75 | 1.738 | 84.25 | 9.0 | 2.133 | 2.26 |
| 6  | 8.823  | 7.013  | 1.810 | 0.472 | 26.08 | 1.338 | 73.92 | 9.0 | 2.133 | 2.18 |
| 7  | 8.538  | 6.761  | 1.777 | 0.391 | 22.00 | 1.386 | 78.00 | 9.0 | 2.133 | 2.25 |
| 8  | 8.818  | 6.815  | 2.003 | 0.326 | 16.28 | 1.681 | 83.92 | 9.0 | 2.133 | 2.18 |
| 9  | 7.716  | 6.566  | 1.150 | 0.661 | 57.48 | 0.489 | 42.52 | 9.0 | 3.000 | 3.50 |
| 10 | 7.716  | 6.435  | 1.281 | 0.111 | 8.67  | 1.170 | 91.33 | 9.0 | 3.500 | 4.08 |
| 11 | 9.987  | 8.461  | 1.526 | 0.549 | 35.98 | 0.977 | 64.02 | 9.0 | 2.133 | 1.92 |
| 12 | 15.625 | 12.523 | 3.102 | 0.782 | 25.21 | 2.320 | 74.49 | 9.0 | 3.500 | 2.02 |
| 13 | 20.568 | 14.507 | 6.061 | 1.068 | 17.62 | 4.993 | 82.38 | 9.0 | 4.000 | 1.75 |
| 14 | 20.552 | 14.838 | 5.714 | 1.155 | 20.21 | 4.559 | 79.79 | 9.0 | 4.000 | 1.75 |
| 15 | 13.228 | 12.162 | 1.066 | 0.319 | 29.92 | 0.746 | 69.98 | 9.0 | 2.217 | 1.51 |
| 16 | 13.228 | 12.264 | 0.964 | 0.204 | 21.16 | 0.760 | 78.84 | 9.0 | 2.167 | 1.47 |
| 17 | 4.409  | 3.773  | 0.636 | 0.361 | 56.76 | 0.275 | 43.24 | 9.0 | 3.333 | 6.80 |
| 18 | 8.818  | 6.309  | 2.509 | 0.604 | 24.07 | 1.905 | 75.93 | 9.0 | 3.333 | 3.40 |
| 19 | 4.409  | 3.767  | 0.642 | 0.305 | 47.51 | 0.337 | 52.49 | 9.0 | 3.667 | 3.05 |
| 20 | 8.818  | 6.342  | 2.476 | 0.514 | 20.76 | 1.962 | 79.24 | 9.0 | 3.667 | 3.74 |
| 21 | 4.409  | 4.089  | 0.320 | 0.249 | 77.81 | 0.071 | 22.19 | 9.0 | 3.667 | 7.49 |
| 22 | 8.818  | 6.493  | 2.325 | 0.395 | 16.99 | 1.930 | 83.01 | 9.0 | 3.667 | 3.74 |
| 23 | 13.228 | 9.725  | 3.503 | 0.837 | 23.89 | 2.666 | 76.11 | 9.0 | 3.667 | 2.49 |
| 24 | 13.228 | 11.220 | 2.008 | 0.571 | 28.44 | 1.437 | 71.56 | 9.0 | 2.500 | 1.70 |
| 25 | 13.228 | 11.526 | 1.702 | 0.551 | 32.37 | 1.151 | 67.63 | 9.0 | 2.500 | 1.70 |
| 26 | 9.913  | 6.946  | 2.967 | 0.823 | 27.72 | 2.146 | 72.28 | 9.0 | 2.500 | 2.27 |
| 27 | 10.582 | 7.192  | 3.390 | 0.905 | 26.70 | 2.484 | 73.30 | 9.0 | 2.500 | 2.13 |
| 28 | 10.582 | 7.388  | 3.194 | 0.751 | 23.50 | 2.444 | 76.50 | 9.0 | 2.500 | 2.13 |

As illustrated in provisional patent application Ser. No. 60/825,002 filed on 8 Sep. 2006, increasing both the temperature from (572° F.→680° F.) and the microwave power (375 kW→600 kW) using a residence time of ~285 ms, produces both a change in the composition as well as the BTU content of the gaseous constituent. The "original" data column is found in provisional patent application Ser. No. 60/766,644 filed 2 Feb. 2006 while the "revised" data and comparison are found in provisional patent application Ser. No. 60/825,002 filed on 8 Sep. 2006. The "revised" liquid fuel characteristics are similar to those of No. 2 diesel fuel. The magnetron efficiency must be a minimum of 88% to achieve the "revised" results. All measured experimental percentages are approximately +/−2%.

TABLE 3

Gas Ref. Conditions: 14.696 psia, 60° F.
Syngas and Liquid Fuel Analyses

| Gas Fuel Analysis: | Original (Avg.) | | Revised | | |
|---|---|---|---|---|---|
| | wt. % | vol. % | wt. % | vol. % | |
| Methane: | 15.86 | 30.984 | 27.04 | 42.132 | |
| Ethane: | 32.15 | 33.511 | 50.43 | 41.924 | |
| Propane: | 7.51 | 5.338 | 9.68 | 5.488 | |
| i-Butane: | 1.16 | 0.626 | 0.07 | 0.030 | |
| n-Butane: | 32.64 | 17.601 | 2.10 | 0.903 | |
| Nitrogen: | 10.68 | 11.940 | 10.68 | 9.523 | |
| Gas Characteristics: | Original (Avg.) | | Revised | | Units |
| Molecular Weight, MW: | 31.3189 | | 24.9790 | | — |
| Specific Gravity, SG: | 1.0812 | | 0.8624 | | — |
| Density, $\rho$: | 0.0817 | | 0.0655 | | lbs/ft$^3$ |
| Specific Volume, v: | 12.2429 | | 15.2762 | | ft$^3$/lb |
| Compressibility, Z: | 0.9895 | | 0.9944 | | — |
| Specific Heat, $C_p$: | 0.4233 | | 0.4425 | | Btu/lb-° F. |
| Specific Heat, $C_v$: | 0.3451 | | 0.3524 | | Btu/lb-° F. |
| Ratio of Specific Heats, k: | 1.2265 | | 1.2557 | | — |
| Heat Value, HHV: | 1,635 | | 1,217 | | Btu/ft$^3$ |
| Heat Value, LHV: | 1,498 | | 1,336 | | Btu/ft$^3$ |
| Gas Constant, R: | 60.397 | | 69.586 | | ft-lb$_f$/lb$_m$-° R. |

TABLE 3-continued

Gas Ref. Conditions: 14.696 psia, 60° F.
Syngas and Liquid Fuel Analyses

| Gas Fuel Analysis: | Original (Avg.) | | Revised | |
|---|---|---|---|---|
| | wt. % | vol. % | wt. % | vol. % |
| Liquid Fuel Analysis | | | | |
| Cetane Index (ASTM D613) | 25 | | | |
| Viscosity @ 40° C. (ASTM D445) | 1.2 cst | | | |
| Specific Gravity (ASTM 4052) | 0.89 | | | |
| API Gravity @ 60° C. (ASTM 4052) | 33.4 | | | |
| Initial Boiling Point (ASTM D86) | 63° C. | | | |
| 50% st. Boiling Point (ASTM D86) | 186° C. | | | |
| Final Boiling Point (ASTM D86) | 347° C. | | | |
| Elemental Iron Content (ASTM D3605) | 2 ppm | | | |
| Elemental Sodium Content (ASTM D3605) | 2 ppm | | | |
| Elemental Silicon Content (ASTM D3605) | 180 ppm | | | |
| Other Trace Metals Content (ASTM D3605) | <1 ppm | | | |
| Sulfur Content: (ASTM D1552) | 0.48 wt. % | | | |
| Carbon Residue Content (ASTM D524) | <0.01 wt. % | | | |
| Ash Content: (ASTM D482) | <0.007 wt. % | | | |
| Copper Strip Corrosion: (ASTM D130) | 2 | | | |

As illustrated in provisional patent application Ser. No. 60/825,002 filed on 8 Sep. 2006, a comparison of the original average tire performance data with "original" average gas data and "revised" gas data is provided in Table 4 below.

TABLE 4

Comparison of Tire Performance Data Based on Average and Revised Gas Analyses

| Process Parameter (60:40 Oil:Gas) | Units | Avg. Gas (60:40) | Rev. Gas (69:31) | Avg. Gas (60:40) | Rev. Gas 69:31) |
|---|---|---|---|---|---|
| | | Demo Unit - Gas Analysis at 14.696 psia, 60° F. | | | |
| Scrap Tire Feedstock: | Tires/day | 20 | 20 | 6,000 | 6,000 |
| Total Operating Hours/Day | Hours | 1 | 1 | 24 | 24 |
| Total Mass Flow: | lbs/min | 6.667 | 6.667 | 83.333 | 83.333 |
| Total Heat Value (15,500 Btu/lb) | MMBtu/hr | 6.200 | 6.200 | 77.500 | 77.500 |
| Gaseous Fuel (40% Wt.): | | Gas Sample (avg.) with 10.68 wt. % Nitrogen | | | |
| Hydrocarbons (HC) + $N_2$: | lbs/min | 1.772 | 1.375 | 22.144 | 17.189 |
| Nitrogen ($N_2$) Mass Flow | lbs/min | 0.189 | 0.147 | 2.365 | 1.836 |
| HC Mass Flow − ($H_2S$, HCl, HBr): | lbs/min | 1.583 | 1.228 | 19.779 | 15.353 |
| Total Volumetric Flow: | ft$^3$/min | 21.688 | 21.007 | 271.11 | 262.58 |
| Specific Volume: | ft$^3$/lb | 12.243 | 15.276 | 12.243 | 15.276 |
| Volumetric Heat Value (HHV): | Btu/ft$^3$ | 1,635 | 1,336 | 1,635 | 1,336 |
| Volumetric Heat Value (LHV): | Btu/ft$^3$ | 1,498 | 1,217 | 1,498 | 1,217 |
| Total Heat Value (HHV): | MMBtu/hr | 2.128 | 1.684 | 26.601 | 21.049 |
| Total Heat Value (LHV): | MMBtu/hr | 1.949 | 1.534 | 24.359 | 19.181 |
| Gas Fuel Equiv. Elect. Pwr. (LHV): | kW | 191 | 150 | 2,388 | 1,880 |
| $H_2S$ Gas to Liquid Scrubber: | | | | | |
| Total Mass Flow ($H_2S$): | lbs/min | 0.0124 | 0.0124 | 0.1554 | 0.1554 |
| Total Volumetric Flow: | ft$^3$/min | 0.1407 | 0.1893 | 1.7633 | 1.7633 |
| Specific Volume: | ft$^3$/lb | 11.347 | 15.265 | 11.347 | 15.265 |
| Volumetric Heat Value$_{MIXTURE}$ (HHV): | Btu/ft$^3$ | 1,633 | 1,334 | 1,633 | 1,334 |
| Volumetric Heat Value$_{MIXTURE}$ (LHV): | Btu/ft$^3$ | 1,496 | 1,215 | 1,496 | 1,217 |
| Total Heat Value (HHV): | MMBtu/hr | 0.0138 | 0.1515 | 0.1668 | 0.1411 |

TABLE 4-continued

Comparison of Tire Performance Data Based on Average and Revised Gas Analyses

| Process Parameter (60:40 Oil:Gas) | Units | Avg. Gas (60:40) | Rev. Gas (69:31) | Avg. Gas (60:40) | Rev. Gas 69:31) |
|---|---|---|---|---|---|
| Total Heat Value (LHV): | MMBtu/hr | 0.0126 | 0.1380 | 0.1528 | 0.1288 |
| Residual Hydrogen Sulfide: | $ppm_{wt.}$/min. | 1.24 (1.24 × 10$^{-6}$ lb/min) | | 15.54 | 15.54 |
| Other Gases to Scrubber: | | | | | |
| Total Mass Flow (NCl): | lbs/min | 0.000470 | | 0.0058 | 0.0058 |
| Total Volumetric Flow: | ft$^3$/min | 0.00499 | | 0.0615 | 0.0615 |
| Specific Volume: | ft$^3$/lb | 10.607 | | 10.607 | 10.607 |
| Residual Hydrogen Chloride: | $ppm_{wt.}$/min | 0.047 (0.047 × 10$^{-6}$ lbs/min) | | 0.58 | 0.58 |
| Total Mass Flow: (HBr): | lbs/min | 0.0042 | | 0.0523 | 0.0523 |
| Total Volumetric Flow: | ft$^3$/min | 0.0201 | | 0.2500 | 0.2500 |
| Specific Volume: | ft$^3$/lb | 4.780 | | 4.780 | 4.780 |
| Residual Hydrogen Bromide: | $ppm_{wt.}$/min | 0.42 (0.42 × 10$^{-6}$ lbs/min) | | 5.23 | 5.23 |
| Liquid Fuel (60% Wt): | | | | | |
| Total Mass Flow: | lbs/min | 2.390 | 2.747 | 29.876 | 34.333 |
| Heat Value (HHV): | Btu/lb | 19,600 | 19,600 | 19,600 | 19,600 |
| Total Heating Value (HHV): | MMBtu/hr | 2.811 | 3.230 | 35.134 | 40.375 |
| Liq. Fuel Equiv. Elect. Pwr (HHV): | kW | 275 | 317 | 3,444 | 3,957 |
| Total Gas/Liquid Fuels: | | | | | |
| Total Heat Value (Gas + Liquid) | MMBtu/hr | 4.759 | 4.764 | 59.494 | 59.556 |
| Total Elect. Equiv. (÷ 3411.8 kW/Btu) | kW | 1,395 | 1,396 | 17,440 | 17,456 |
| Elect. Pwr. Generation Summary: | | | | | |
| Electrical Power – ICGT: (× 0.35) | kW | 488 | 489 | 6,104 | 6,018 |
| Elect. Pwr – Gen. Out.: (× 0.985 × 0.97) | kW | 466 | 467 | 5,832 | 5,837 |
| Liq. Fuel Equivalent Elect. Power | kW | 275 | 317 | 3,444 | 3,957 |
| Gas Fuel Equivalent Elect. Power: | kW | 191 | 150 | 2,388 | 1,880 |
| Microwave Power to Process: | kW | 30.16 | 35.26 | 377.06 | 440.79 |
| Elect Pwr Req'd by Microwave: (÷ 0.88) | kW | 34.27 | 40.07 | 428.48 | 500.90 |
| Ancillary Losses: | | | | | |
| Less Elect. Pwr – N$_2$ Gen.: | kW | 11.19 | 11.19 | 22.38 | 22.38 |
| Less Elect. Pwr – Scrubber: | kW | 1.12 | 1.12 | 2.24 | 2.24 |
| Less Elect. Pwr – Chiller $_{(Mag/P.S./CND)}$: | kW | 9.12 | 9.12 | 80.55 | 85.87 |
| Total Ancillary Loads: | kW | 21.43 | 21.43 | 105.17 | 110.49 |
| MW Power Requirement: | kW | 34.27 | 40.07 | 428.48 | 500.90 |
| Total Elect. Pwr. Req'd. | kW | 55.70 | 61.50 | 533.65 | 611.39 |
| Net Electrical Power for Export:kW (Gas Fuel) | | +135 | +88.5 | +1,854 | +1,269 |
| Other By – Products: Carbon/Carbon Black/MOF Mixture: | | | | | |
| CB w/Metal Oxides, Fillers (MOF's): | lbs/min | 1.913 | 1.913 | 23.915 | 23.915 |
| Metal Oxides, Fillers (MOF's): | lbs/min | 0.289 | 0.289 | 3.618 | 3.618 |
| Net Carbon Black: | lbs/min | 1.624 | 1.624 | 20.297 | 20.297 |
| Carb. Black Ht.Value (14,096 Btu/lb) | MMBtu/hr | 1.374 | 1.374 | 17.166 | 17.166 |
| Other By – Products: Steel: | | | | | |
| Plated High – Carbon Steel: | lbs/min | 0.770 | 0.770 | 9.625 | 9.625 |
| Energy Balance: | | | | | |
| Tire Feedstock: | MMBtu/hr | 6.200 | 6.200 | 77.500 | 77.500 |
| Less Carbon Black: | MMBtu/hr | 1.374 | 1.374 | 17.166 | 17.166 |
| Less Liquid Fuel: | MMBtu/hr | 2.811 | 3.230 | 35.134 | 40.375 |
| Less Gaseous Fuel$_{LHV}$: | MMBtu/hr | 1.949 | 1.534 | 24.359 | 19.181 |
| Less Hydrogen Sulfide$_{LHV}$: | MMBtu/hr | 0.013 | 0.014 | 0.153 | 0.128 |
| Total Energy Recovered: | MMBtu/hr | 6.147 | 6.152 | 76.812 | 76.850 |
| Net Energy Difference: | MMBtu/hr | -0.053 | -0.048 | -0.688 | -0.650 |
| MMBtu/hr × 293.1 × 0.35 × 0.985 × 0.97 = kW equiv. | | -5.195 | -4.705 | 67.434 | 63.710 |
| | % Difference | -0.85 | -0.77 | -0.90 | -0.84 |
| Magnetron Heat Load (12%): | Btu/hr | 14,022 | 16,411 | 175,435 | 205,083 |
| Control Panel Heat Load [P.S] (10%): | Btu/hr | 12,991 | 15,190 | 162,432 | 189,886 |
| Gas Condensor Heat Load (QΔTC$_p$): | Btu/hr | 24,365 | 22,634 | 298,072 | 282,948 |
| Total Heat Load: | Btu/hr | 51,378 | 54,235 | 635,939 | 677,917 |

When the invention is used in the reduction mode, it is envisioned that both decrosslinking, depropagation, and depolymerization reactions are contemplated and within the scope of this invention. In one such embodiment, waste organic materials, such as scrap tires, are gasified by the continuous application of high power density microwave energy, using a continuous, self-aligning, stainless steel belt with 4 inches (10.16 cm) material retaining sides to produce stable by-products, which includes essentially ethane and methane.

When the invention is used in this mode, a process is provided for the recovery of specified gaseous products and includes maintaining the hydrocarbon vapor stream at least as high as an equilibrium temperature, above which the specified products are thermodynamically favored, followed by rapidly cooling the hydrocarbon vapor stream to a temperature at which the specified products are stabilized.

When gasifying shredded scrap tires, the preferred gaseous product is a hydrocarbon vapor stream, which consists of substantially ethane and methane in a ratio of two parts ethane to one part methane by weight plus 10% by weight nitrogen. A product stream, which varies from the preferred range, but is still acceptable, includes ethane, methane, and propane, at two parts ethane, to one part each of methane and propane, in addition to 10% by weight nitrogen. Another product stream, which varies further from the preferred range, but is also acceptable, includes ethane, butane, methane, and propane, at two parts each of ethane and butane to one part methane, and one part propane by weight, in addition to 10% by weight of nitrogen. Mixtures of ethane/methane, as well as those also containing propane and butane, have very high heat values, even when diluted with 10% nitrogen by weight, but can be directly injected into some ICGT combustion chambers without further treatment.

Conditions within the microwave applicator are selected so as to produce the desired components or gas:oil ratio in the hydrocarbon vapor stream. In a preferred embodiment, no liquid products, e.g., oils, will be produced. In order to insure that a 2:1 ratio of ethane:methane is produced, the feed rate, residence time, power density, energy level from the magnetrons is controlled as well as the pressure and temperature within the applicator.

In a typical scrap rubber tire reduction case, the following conditions will produce the desired ethane:methane mixture. The preferred applicator will contain anywhere from 3 to 10 microwave chambers, preferably six (6) magnetrons, each magnetron operating at about 915 MHz. Under these conditions, at steady-state operation, a residence time of approximately 285 milliseconds in the applicator, will result in a temperature in the applicator of about 680° F. (360° C.). Typically, the process pressure within the applicator will range from 0.1 to 0.5 psig (0.69–3.45 kPa). As kinetics favor reactions below equilibrium, the intermediate reactions release free hydrogen, which furthers the reduction of more complex organic molecules, leading to further breakdown, and a higher rate of reduction. The chemical reactions are exothermic in nature.

For crosslinked styrene-butadiene rubbers (SBR), the production of gaseous products includes the initial depolymerization of the sulfur crosslinks, followed by the addition of further microwave energy over time, resulting in the depropagation and breakdown of the two main polymers to form the desired products. At temperatures above about 680° F. (360° C.), depending on the feedstock, thermodynamics favor methane and ethane over the original polymers or other polymers. Accordingly, once depropagation and depolymerization is complete by maintaining those temperatures and applying the requisite microwave energy over a period of time, the gas stream remains stable at the high temperature. Very rapid cooling will prevent repolymerization or recombination of the gas constituents. The hydrocarbon gas stream is then flash-cooled, preferably down to about 100° F. (38° C.), to stabilize the ethane and methane at the lower temperatures. The residence time of the gas stream in the applicator is controlled in large part by the total pressure imposed by the nitrogen purge gas and the pressure developed by the formation of the hydrocarbon gaseous products of reduction, in conjunction with the flow rate set by the eductor at the inlet of the gas scrubber. The hydrocarbon vapor stream is then scrubbed to remove hydrogen sulfide, hydrogen chloride, and hydrogen bromide gases, hereafter referred to as contaminants.

The hydrocarbon vapor stream is scrubbed of its contaminants by a dry-contact, top-fed packed tower, packed with limestone and dolomite, while maintaining the gas temperature above the equilibrium point. A compressor must be used to force the hydrocarbon vapor stream through the scrubbing tower. The clean hydrocarbon vapor stream then exits and is flash cooled in an aluminum air-to-air heat exchanger, with liquid nitrogen acting as the cooling medium. The dry scrubber removes approximately 95-97% of the contaminants.

Alternately, the hydrocarbon vapor stream is scrubbed of its contaminants, preferably by a gas-contact, liquid scrubber, containing a dilute, aqueous solution of sodium hydroxide (NaOH) and sodium hypochlorite (NaOCl). The liquid scrubber eliminates the requirement for a compressor, as the scrubber eductor effects a 6 inch (15.24 cm) vacuum on the hydrocarbon gas stream flowing at approximately 285 acfm (484.2 $m^3$/hr). The scrubber is designed with two 12 inch (30.48 cm) diameter towers, containing special packing to minimize the overall height. The entire scrubber system is manufactured from high-density polyethylene. The liquid scrubber removes 99.99% of the contaminants, requires less space, and is more cost-effective in regards to the consumable chemicals than the dry scrubber. The scrubber tank containing chemical solutions is mounted under the twin packed-towers to provide stability to the towers in the mobile version. Column height, diameter and chemical tank size is determined by the process gas equilibrium and the desired removal efficiency.

Control of the liquid scrubber with its blowdown, makeup, and scrubbing cycles, is accomplished by the same PLC program, used for control of the microwave reduction process. In the mobile version of the invention, the liquid scrubber is installed in the microwave generator trailer, forward of the microwave generators and power distribution center. In the mobile version of the invention, makeup water for this system is pumped from a water reservoir installed under the applicator on the applicator trailer. Regardless of which scrubber is used, the hydrocarbon vapor stream exits the applicator and passes through a multiple-pass, water-cooled water-to-air process gas condenser. The process gas condensor provides cooling and stabilization of the gaseous products, while allowing recovery of the oil products. Residence time in the condensor is sufficient to allow the oil forming reactions to go to completion, while permitting the lighter, paraffin gases to stabilize and be drawn to the liquid scrubber.

A blanketing or purge gas is often used, nitrogen and argon being the two preferred gases. This gas may be supplied through drilled orifices through the choke pins in each R.F. trap. Nitrogen is preferred due to its lower cost, but has the potential of reacting with aromatic gaseous products of reduction, such as benzene, toluene, xylene, etc. With precise control of the applied microwave power and hydrocarbon gas residence time, in order to achieve the necessary reduction, formation of nitro-arene compounds can be avoided. Nitrogen gas is provided by a Nitrogen Generator, which includes a compressor and molecular sieve to produce relatively high-purity (≥98% purity) nitrogen.

The nitrogen generator is backed up with eight standard nitrogen bottles, in the event of a failure, while also acting as a deluge system in the event of a fire in the applicator. In the mobile version of the invention, the complete nitrogen system is installed in the microwave generator trailer forward of the hydrocarbon vapor scrubber. Oxygen sensors are also installed in this trailer to warn of a nitrogen leak, to prevent asphyxiation due to displacement of the air by the nitrogen.

Alternately, argon can be used since it is an inert gas, but at a higher cost, although lowered accounts are typically required due to its higher molecular weight. When operating this invention in the plasma mode, argon is used as both the plasma gas and the blanketing gas, thereby eliminating the possible formation of unwanted nitrogen-arene products.

Although the 100 kW magnetrons operate at 92% efficiency, the remaining 8% manifests itself as heat. Rejection of this heat is accomplished by a water-air chiller, sized for up to six (6) microwave generators. With the replacement of the inductive (transformer-based) power supply system with the switched-mode power supply, total heat load is reduced. In the mobile version of the invention, the chiller is installed at the front of the microwave generator trailer, forward of the nitrogen generator system. In the mobile version of the invention, cooling water is pumped from a water reservoir, installed under the applicator on the applicator trailer, through the chiller system and back into the microwave generators in a closed-loop mode.

Power for the mobile version of the microwave reduction system, is provided by an onboard diesel electric generator, capable of generating 750 kW, which is the total load from the microwave generators totaling 600 kW of microwave energy, and the ancillary items, including the nitrogen generator system, liquid scrubber system, and chiller system. All pertinent electrical parameters regarding the diesel generator operation are displayed on a continuously updated LCD module, located on the front of the generator control panel. Fuel for the diesel electric generator is pumped from a day tank, installed under the forward section of the applicator on the applicator trailer.

Discussion

Without being held to one theory of operation, or one mode of performance, it is believed that the benefits of the invention are derived at least in part, by introducing microwave excitation of water molecules inside the organic material by subjecting the material to high frequency radio waves in the ultra-high frequency (UHF) band. The polar water molecules in the material attempt to align themselves with oscillating electric field at a frequency of 915 MHz or approximately every nanosecond, As the molecules cannot change their alignment synchronously with the changing electric field, the resistance to change manifests itself as heat, and the moisture trapped within the material is released as water vapor or steam. The heat conducted through the material and capillary action within the material converts any surface moisture to water vapor. This efficient release of moisture from the organic material reduces energy costs and increases throughput. In the case of non-polar molecules, the applied microwave energy is coupled to the entire volume of the material, resulting in dielectric polarization. Since a phase difference occurs between the applied electric field and the energy absorbed within the material, the losses within the material act as a resistance, resulting in additional heat generated within the material. The heat generated from dipolar and dielectric heating of the material is sufficient to effectively cause bond dissociation, generation of free radicals and hydrogen, resulting in the volumetric reduction of the material and formation of recoverable by products.

As the invention is designed for unattended, automatic operation, with a display in the customer's main control room, no additional operating personnel are needed. The use of this invention results in an immediate increase in process efficiency from 20-30% with incineration, 30-40% with pyrolysis, to over 85% with high-density microwave energy operating at 915 MHz, without any consideration for heat recovery.

However, in the case of tires, plastics, PCB's, e-waste (computer waste), roofing shingles, shale oil and bituminous coal, a phenomena known as thermal runaway, occurs due to the inability of these materials to dissipate the internal heat, caused by microwave excitation of polar and non-polar materials, sufficiently fast to their surroundings. Therefore, the increase in enthalpy is greater within the material than in the surrounding region. The internal temperature continues to increase at an even faster rate, and decomposition of the organic material subsequently occurs. When a high power density electric field is applied at 915 MHz, metal particles within the material separate, leading to a higher loss factor, particularly after decomposition begins, resulting in products of decomposition with an even higher loss factor. Since the loss factor is directly proportional to the power density and the rise in temperature, the material is subjected to even higher internal power dissipation. As carbon is one of the intermediate products of high-temperature decomposition by microwave reduction, and has a much higher loss factor than plastics or rubber, the higher temperature leads to even greater power dissipation within the material, leading to further molecular breakdown. Hydrogen released during the molecular breakdown and the thermal runaway phenomenon produce an intense series of exothermic reactions, until equilibrium occurs. Above equilibrium, thermodynamic control is favored.

Raw Material Particle Sizing Aspects

The starting material for this invention, as in the case of scrap tires, is typically in a random chunk form, a diameter or thickness, which typically varies from ½ inch (12.7 mm)×½ inch (12.7 mm) or smaller, to a maximum which does not typically exceed 2 inches (5.08 cm). This invention will also process material, which has been generated by a hammer mill, whose scrap tire material approaches 3 inches (7.62 cm) in size. The penetration depth of this material at 915 MHz is several inches, and the material retaining sides of the belt are 4 inches (10.16 cm) in height; therefore, the random raw material sizes, as provided by the scrap tire shredders and chippers, are acceptable.

An additional desirable aspect of the raw material is that the scrap tire material be subjected to a steel wire removal system. Though this step is not necessary for the proper operation of the invention, steel wire removal contributes to an additional 12-15% process efficiency for the microwave reduction system, which more than offsets the cost of the steel wire removal.

Contact Time

The material contact time of the material within the applicator is primarily dependent on the speed of the belt, which is controlled by a variable speed motor, which in a typical application will range from 1 to 8 feet per minute (0.305-2.44 meters per minute). Increasing the contact time within the applicator will increase the types of products; i.e., gas:oil ratio and composition of the hydrocarbon vapor stream. Increasing the contact time still further will result in bond breaking, leading to decrosslinking, or depropagation or depolymerization or all three, occurring either simultaneously or sequentially, dependent on the applied microwave power density and applicator pressure.

Waveguide Orientation

In a preferred embodiment, the waveguides will be bifurcated and positioned at 90° with respect to the X and Y axes. In this orientation, the microwaves will be essentially out of phase with respect to each other. Through experimentation, it was determined that the most uniform microwave power density was produced using this configuration, without going to the arc-over point or the voltage breakdown point. Due to the presence of the nitrogen or argon, higher microwave power density can be applied to the applicator, as nitrogen and argon significantly raise the voltage breakdown point. Further, nitrogen and argon serve as a blanketing or purge gas within the waveguide, in the event of failure of the pressurized fused quartz, dual window assembly.

Microwave Frequency

Historically, the frequency of 915 MHz was not originally allocated for use in the Industrial, Scientific, and Medical (ISM) applications throughout the world, and no allocation for 915 MHz applications exist today in continental Europe. However, in the United Kingdom, 894 MHz is allocated for industrial applications, a frequency at which this invention is capable of operating. In North and South America, 915 MHz is allocated for unlimited use in industrial applications. Operation at 915 MHz is allowable in most parts of the world with proper screening and grounding to avoid interference with communications equipment.

Formerly, only low power magnetrons (<3 kW) were available for 2450 MHz use, but 15-60 kW magnetrons were available for 915 MHz use. Currently, magnetron selection from 2.2-60 kW exists at 2450 MHz, while magnetrons operating a 915 MHz are available from 10-200 kW. The preferred frequency of operation at 915 MHz for this invention was chosen primarily for increased penetration depth, increased power availability, increased operating efficiency, and longer operating life, resulting in a reduced number of magnetrons and lower cost per kilowatt of microwave output power.

Pathogen Destruction

The invention mechanically and biologically introduces microwave excitation of the water molecules inside municipal solid waste (MSW), biosolids, medical waste, and non-metallic construction waste by subjecting the material to high frequency radio waves in the ultra-high frequency (UHF) band. The pathogens and polar water molecules in the material attempt to align themselves with the oscillating electric field at a frequency of 915 MHz or approximately every nanosecond. The pathogens or molecules within the pathogens cannot align themselves synchronously with the applied electric field, creating an atmosphere of excitation, which causes heat and explodes the pathogens structurally.

At this point of excitation, not only do the pathogens self-destruct, the attached water molecules of the pathogens and organic material release the trapped moisture as water vapor. The water vapor is channeled from the inside of the organic material to the surface and edges by capillary action; where it is drawn toward the liquid scrubber. With the scrubber operating pH of >11.5, any remaining airborne pathogens, not destroyed by the high power density electric field provided by the microwave energy, cannot survive in the caustic scrubber environment; hence, no pathogens will be exhausted to the outside atmosphere. This is particularly important in treatment of biosolids and medical waste. While using this invention, all data to-date has confirmed a 100% pathogen kill.

Microwave excitation can further reduce the volume of the MSW, biosolids, medical waste, and non-metallic construction waste to carbon, through molecular reduction, as described previously in relation to plastics, rubber, etc. However, this is not usually required in these industries. Only drying, pathogen kill, and volumetric reduction are the typical primary objectives. The result of using this invention for the above preceding applications not only meets, but also exceeds all requirements for Class A, Alternative 6 of 40 C F.R. Part 503 specification for Process to Further Reduce Pathogens (PFRP).

The process of one preferred embodiment of this invention foresees a process for reducing an organic material to its constituents. The process includes the steps of feeding a sample of an organic compound into an infeed system which contains a purge gas; transferring the sample of the organic material into at least one microwave applicator containing a purge gas; and exposing the sample in the microwave applicator to at least two sources of microwaves which are in non-parallel alignment to each other for a period of time sufficient to volumetrically reduce the sample of organic material to its constituents.

The process of a further preferred embodiment may further include the steps of: collecting a gaseous byproduct constituent formed during the volumetric reduction of the sample in the microwave applicator; and exposing the collected gaseous byproduct constituent to a condensor for a sufficient time to allow condensables in the gaseous byproduct constituent to form a liquid. That liquid may then be collected from the condenser; and exposed to a filter system to remove residual water. The non-condensables of the gaseous byproduct constituent may be collected from said condenser; and exposed to a gas-contact liquid scrubber to remove contaminants.

The solid byproduct constituents from the volumetrically reduced sample in said microwave applicator may also be collected and fed into an infeed system which contains purge gas. The solid byproduct constituents may be magnetically separated to separate the carbon components from the magnetic metal components. The carbon and magnetic metal components may be vacuum separated.

During the volumetric reduction process of some preferred embodiments, the at least two sources of microwave energy may be propagated from a bifurcated waveguide assembly. That waveguide assembly may introduce microwaves which are 90° out of phase to each other and may be between approximately 915 MHz and approximately 1000 MHz, but preferably approximately 915 MHz. The purge gas in the infeed system may be preferably nitrogen or argon in some preferred embodiments.

The process of some preferred embodiments may be utilized to volumetrically reduce shredded scrap tires, wherein the scrap tires are reduced to constituents of at least hydrocarbon gas and carbon, volumetrically reduce shredded asphalt roofing shingles, wherein the shingles are reduced to constituents of at least hydrocarbon gas, carbon, and fiberglass, volumetrically reduce shredded computer waste, wherein the computer waste is reduced to constituents of at least hydrocarbon gas, carbon, and metals, volumetrically reduce shredded scrap rubber, wherein the scrap rubber is reduced to constituents of at least hydrocarbon gas and carbon, volumetrically reduce PCB, PAH and HCB-laden materials, wherein the PCB, PAH and HCB-laden materials are reduced to non-carcinogenic materials suitable for standard landfill disposal, volumetrically reduce shredded municipal solid waste (MSW), volumetrically reduce medical waste, volumetrically reduce existing rock formations of existing shale oil and reducing the shale oil to its constituents of hydrocarbon gas, oil and carbon, and volumetrically reduce and desulfurizing bituminous coal, wherein the bituminous coal is reduced to constituents of at least hydrocarbon gas, oil, carbon and ash.

The apparatus used in some preferred embodiments of this invention includes a movable chassis comprising at least one microwave generator; at least one sealed and purged microwave applicator in proximity to a material to be reduced and in communication with the microwave generator via a waveguide; the applicator having at least two sources of microwaves from the microwave generator, with the microwaves being in non-parallel alignment to each other, a microwave energy absorber to absorb any reflected microwaves, a process chiller to maintain the magnetron cooling medium within the specified operating temperature range, and a sealed and purged multi-shuttered or rotary airlock infeed and outfeed system to move material into and out of the applicator.

The apparatus of some preferred embodiments may also include: a process gas condenser to separate condensable and non-condensable hydrocarbon vapors; and a gas-contact liquid scrubber to remove 99.99% of contaminants, including hydrogen sulfide, hydrogen chloride, and hydrogen bromide.

The at least two sources of microwaves in some preferred embodiments may be propagated from a bifurcated waveguide assembly, that may introduce microwaves, which are 90° out of phase to each other. Those microwaves may be between approximately 915 MHz and approximately 1000 MHz, but are preferably 915 MHz. The magnetron cooling medium temperature may be maintained by a process chiller, and the microwave energy absorber may be a 3-port ferrite circulator. The apparatus may further include an RF chokepin trap.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for reducing an organic-containing material into lower molecular weight gaseous hydrocarbons, liquid hydrocarbons and solid carbon constituents, said process comprising the steps of:
    feeding a sample of said organic-containing material into an infeed system, wherein said infeed system contains a non-flammable blanketing purge gas;
    transferring said material into at least one microwave applicator containing said purge gas in a pressurized state above local atmospheric pressure;
    exposing said material in said microwave applicator to at least two sources of microwaves from a bifurcated waveguide for a period of time sufficient to volumetrically reduce said material into said constituents, a frequency of said microwaves between approximately 894 MHz and approximately 1000 MHz and without an external heat source,
        said microwaves being in non-parallel alignment to each other, such that one waveguide entry section to each applicator entry point is parallel to the flow of the organic material while the other is perpendicular to the flow of the organic material, and further wherein an impedance mismatch of said microwaves through said bifurcated waveguides results in circular polarization;
    monitoring said microwaves so that any reflected microwave energy is redirected by a circulator and absorbed by a water load;
    collecting gaseous byproduct constituents from said volumetrically reduced sample in said microwave applicator;
    purging an outfeed system for said organic-containing material with said non-flammable blanketing purge gas;
    removing said volumetrically reduced organic-containing material from said transporting means after passage from said outfeed system; and
    cooling said collected gaseous byproduct constituents for a sufficient time to allow condensables in said gaseous byproduct constituents to form a liquid.

2. The process of claim 1 which further comprises the steps of:
    feeding said collected gaseous byproduct constituents into an electrical generator comprising a gas turbine to generate electricity; and
    transporting said purge gas to pressurized quartz window assemblies at an end of each waveguide leading into said at least one microwave applicator.

3. The process of claim 1 which further comprises the steps of:
    collecting said liquid from said step of cooling; and
    exposing said liquid to a filter system to remove residual water.

4. The process of claim 1 which further comprises the steps of:
    collecting non-condensables in said gaseous byproduct constituents from said step of cooling; and
    exposing said non-condensables to a scrubber to remove contaminants.

5. The process of claim 1 which further comprises the steps of:
    collecting solid byproduct constituents from said volumetrically reduced sample in said microwave applicator; and
    magnetically separating a carbon component from a magnetic metal component within said collected solid byproduct constituents.

6. The process of claim 5 which further comprises the step of:
    vacuum separating said carbon component from said magnetic metal component.

7. The process of claim 1 wherein
    said bifurcated waveguide assembly introduces microwaves which are 90° out of phase to each other.

8. The process of claim 1 wherein
    said purge gas is nitrogen or argon.

9. The process of claim 1 wherein
    said frequency is approximately 915 MHz.

10. The process of claim 1 wherein
    said process is utilized to volumetrically reduce shredded scrap tires, wherein said scrap tires are reduced to constituents comprising hydrocarbon gas and carbon.

11. The process of claim 1 wherein
    said process is utilized to volumetrically reduce shredded asphalt roofing shingles, wherein said shingles are reduced to constituents of at least hydrocarbon gas, carbon, and fiberglass.

12. The process of claim 1 wherein
said process is utilized to volumetrically reduce shredded computer waste, wherein said computer waste is reduced to constituents of at least hydrocarbon gas, carbon, and metals.

13. The process of claim 1, wherein
said process is utilized to volumetrically reduce shredded scrap rubber, wherein said scrap rubber is reduced to constituents of at least hydrocarbon gas and carbon.

14. The process of claim 1, wherein
said process is a utilized to volumetrically reduce polychlorinated biphenyl, polyaromatic hydrocarbon and chlorinated benzene-laden materials,
wherein said polychlorinated biphenyl, polyaromatic hydrocarbon and chlorinated benzene-laden materials are reduced to non-carcinogenic materials suitable for standard landfill disposal.

15. The process of claim 1, wherein
said process is utilized to volumetrically reduce shredded municipal solid waste.

16. The process of claim 1, wherein
said process is utilized to volumetrically reduce medical waste.

17. The process of claim 1, wherein
said process is utilized to volumetrically reduce existing rock formations of existing shale oil and reducing said shale oil to its constituents of hydrocarbon gas, oil and carbon.

18. The process of claim 1, wherein
said process is utilized to volumetrically reduce and desulfurize bituminous coal, wherein the bituminous coal is reduced to its constituents of at least hydrocarbon gas, oil, carbon and ash.

19. The process of claim 2, wherein
a temperature within said at least one microwave applicator is at least 680° F.;
a microwave energy of said at least two sources of microwaves is at least 600 kW; and
a weight percent ratio of $C_1$-$C_2$ hydrocarbon gases to $C_3$-$C_4$ hydrocarbon gases is at least approximately 6.5 after said step of collecting gaseous byproduct constituents from said volumetrically reduced sample in said microwave applicator and prior to said step of feeding said collected gaseous byproduct constituents into said gas turbine.

20. The process of claim 19, wherein
a weight percent of n-butane is approximately 2 wt. % or less after said step of collecting gaseous byproduct constituents from said volumetrically reduced sample in said microwave applicator and prior to said step of feeding said collected gaseous byproduct constituents into said gas turbine.

21. The process of claim 3, wherein
a liquid hydrocarbon content has characteristics of a No. 2 diesel fuel after said steps of:
collecting said liquid from said step of cooling; and
exposing said liquid to a filter system to remove residual water.

22. The process of claim 20, wherein said gas composition after said step of collecting gaseous byproduct constituents from said volumetrically reduced sample in said microwave applicator and prior to said step of feeding said collected gaseous byproduct constituents into said gas turbine comprises:
~27% by weight methane;
~50% by weight ethane;
~10% by weight propane;
<1% by weight i-butane;
~2% by weight n-butane; and
a balance of nitrogen.

23. The process of claim 2, wherein
a temperature within said at least one microwave applicator is below 680° F.;
a microwave energy of said at least two sources of microwaves is less than 600 kW;
a weight percent ratio of $C_1$-$C_2$ hydrocarbon gases to $C_3$-$C_4$ hydrocarbon gases is approximately 1 after said step of collecting gaseous byproduct constituents from said volumetrically reduced sample in said microwave applicator and prior to said step of feeding said collected gaseous byproduct constituents into a gas turbine.

24. The process of claim 1 wherein
a residence time within said at least one microwave applicator is approximately 285 milliseconds; and
a temperature within said at least one microwave applicator is at least approximately 680° F.

25. The process of claim 1 wherein said process further comprises the step of:
grinding said material after existing said outfeed system.

26. The process of claim 2 wherein said step of feeding said collected gaseous byproduct constituents into a gas turbine coupled to an electrical generator to provide electricity to at least an external electrical grid process further comprises the step of:
simultaneously providing electricity to both a microwave generator and to said external electrical grid.

27. An apparatus for reducing an organic-containing material into lower molecular weight gaseous hydrocarbons, liquid hydrocarbons and solid carbon constituents which comprises:
at least one microwave generator;
at least one sealed and purged microwave applicator, said microwave applicator purged with a non-flammable blanketing purge gas in proximity to a material to be reduced and in communication with said microwave generator via a pair of waveguides, said at least one microwave applicator containing said purge gas in a pressurized state above local atmospheric pressure;
said applicator having at least two sources of microwaves from said microwave generator, a frequency of said microwaves is between approximately 894 MHz and approximately 1000 MHz, said microwaves being in non-parallel bifurcated alignment to each other from a waveguide assembly, such that one waveguide entry section to each applicator entry point is parallel to the flow of said material while the other is perpendicular to the flow of said organic material, and further wherein an impedance mismatch of said microwaves through said bifurcated waveguides results in circular polarization;
a microwave energy absorber to absorb any reflected microwaves, said absorber comprising:
a microwave monitor to detect reflected microwave energy;
a circulator to redirect any reflected microwave energy; and
a water load to absorb any reflected microwave energy;
said applicator receiving only microwave energy;
a transporting means with raised sides to transport said organic-containing material through said at least one applicator;

a purge gas generating means to provide a purge gas to said microwave applicator during an initial purge cycle and over the organic material under reduction during operation;

said purge assembly system comprising:
an infeed purge assembly; and
an outfeed purge assembly;
said infeed and outfeed purge assemblies purged by said purge gas from said purge gas generating means;
a process gas cooling means to separate condensable and non-condensable hydrocarbon vapors;
said apparatus comprising no means capable of supplying external heat to said material to be reduced.

28. The apparatus of claim 27 which further comprises:
a gas turbine operatively coupled to an electrical generator to use said non-condensable hydrocarbon vapors to generate electricity.

29. The apparatus of claim 27 wherein
said frequency is approximately 915 MHz.

30. The apparatus of claim 27 wherein
said microwave energy absorber is a 3-port ferrite circulator.

31. The apparatus of claim 27 which further comprises
an RF choke-pin trap.

32. A process for generating electricity from reducing organic-containing materials into lower molecular weight gaseous hydrocarbons, liquid hydrocarbons and solid carbon constituents, said process comprising the steps of:
feeding a sample of said organic-containing material into an infeed system, wherein said infeed system contains a non-flammable purge gas;
transferring said material into at least one microwave applicator containing said purge gas at a pressure above local atmospheric pressure;
exposing said material in said microwave applicator to at least two sources of microwaves from a bifurcated waveguide for a period of time sufficient to volumetrically reduce said material into said constituents, a frequency of said microwaves between approximately 894 MHz and approximately 1000 MHz,
said microwaves being in non-parallel alignment to each other, such that one waveguide entry section to each applicator entry point is parallel to the flow of the organic material while the other is perpendicular to the flow of the organic material, and further wherein a distance from the output from the bifurcated waveguide which couples the microwave energy to the applicator entry point parallel to the flow of the organic material is physically longer than the output feeding the perpendicular port;
monitoring said microwaves;
collecting gaseous byproduct constituents from said volumetrically reduced sample in said microwave applicator;
purging an outfeed system for said organic-containing material with said non-flammable purge gas;
removing said volumetrically reduced organic-containing material from said transporting means after passage from said outfeed system;
cooling said collected gaseous byproduct constituents for a sufficient time to allow condensables in said gaseous byproduct constituents to form a liquid; and
feeding said collected gaseous byproduct constituents into a gas turbine.

33. The process of claim 32 wherein said step of feeding said collected gaseous byproduct constituents into a gas turbine further comprises the step of:
coupling said gas turbine with an electrical generator to generate electricity.

34. The process of claim 32
said purge gas is nitrogen or argon.

35. The process of claim 32 wherein
said frequency is approximately 915 MHz.

* * * * *